United States Patent [19]

Koga

[11] Patent Number: 4,979,058
[45] Date of Patent: Dec. 18, 1990

[54] ROTATION DETECTING DEVICE FOR A TAPE RECORDER

[75] Inventor: Noriyuki Koga, Tokyo, Japan

[73] Assignee: Sony Corporation, Tokyo, Japan

[21] Appl. No.: 372,533

[22] Filed: Jun. 28, 1989

[30] Foreign Application Priority Data

Jun. 28, 1989 [JP] Japan .................................. 63-159871

[51] Int. Cl.$^5$ ............................................. G11B 15/26
[52] U.S. Cl. ..................................... 360/74.2; 360/137
[58] Field of Search ...................... 360/137, 74.1, 74.2, 360/74.3, 96.5, 90, 96.1, 71; 242/193–200

[56] References Cited

U.S. PATENT DOCUMENTS 4,581,665  4/1986  Ip et al. ............................... 360/74.2
4,646,302  2/1987  Ono .................................. 360/137 X

Primary Examiner—A. J. Heinz
Assistant Examiner—Alfonso Garcia
Attorney, Agent, or Firm—Hill, Van Santen, Steadman & Simpson

[57] ABSTRACT

The present invention resides in a rotation detecting mechanism for a tape recorder including a movable shut-off lever for setting at least a reproducing lever or a head base at a stop state position, with the reproducing lever or the head base being previously set to the reproducing state position, a movable changeover lever for interchangeably setting the normal reproducing direction or the reverse reproducing direction of a magnetic tape, a switching device for selectively shifting and setting the shut-off lever or the changeover lever, a movable trigger lever for selectively triggering the switching device a detecting lever rotationally biased in a direction which is in accordance with the rotation and the rotational direction of a reel block, and a cam gear rotated perpetually in one direction including in turn a first cam surface guiding one end of the detecting lever when the detecting lever is rotationally biased in one direction, a second cam surface guiding one end of the detecting lever when the detecting lever is rotationally biased in the other direction, a detecting pawl protuberantly formed between and independently of the first cam surface and the second cam surface, and a center ring section responsive to the cessation of rotation of the reel block to guide one end of the detecting lever released from rotational biasing towards a rotational trajectory of the detecting pawl. The detecting pawl thrust the one end of the detecting lever so that the other end of the detecting lever actuates the trigger lever.

9 Claims, 13 Drawing Sheets

ROTATION DETECTING DEVICE FOR A TAPE RECORDER

BACKGROUND OF THE INVENTION

1. Field of the Invention

This invention relates to a rotation detecting mechanism for a tape recorder. More particularly, it relates to a rotation detecting mechanism for a tape recorder provided with a so-called auto reverse mechanism for automatically reversing the running direction of a recording magnetic tape when the tape end is reached in the recording or reproducing mode or with a so-called auto shut-off mechanism for automatically setting the tape recorder to a stop mode when the tape end is reached, wherein the rotation or cessation of rotation of reel blocks rotating with the tape feed or of various gears or pulleys rotating by the operation of a driving electric motor is sensed for detecting the tape end to reverse the running direction or stop the running of the recording magnetic tape.

2. Related Art Statement

There has been proposed a tape recorder adapted for recording and/or reproducing information signals on a recording tape, such as a magnetic recording tape, wherein the tape recorder is provided with the so-called auto-reverse function of reversing the tape feed direction or the so-called auto shut-off function of establishing a stop mode when the tape arrives at its end in the recording and/or reproducing mode.

This type of tape recorder is provided with rotation sensing or detecting means whereby cessation of rotation of rotating members such as reel blocks, gears or pulleys rotated with the feed of the recording tape may be sensed.

As the rotation sensing or detecting means, there is known optical sensing means for sensing rotation of a rotating member wherein the rotating member is provided with portions of different light reflectivity or slits, the light is irradiated on these portions or slits and changes caused in the intensity of the light reflected from or transmitted through the rotating member are sensed for sensing the rotation or cessation of rotation of the rotating member. Also known are magnetic or electrical sensing means for sensing the rotation of the rotating member.

For sensing the rotation of the rotating member by optical means as the rotation detecting means for a tape recorder, it is necessary to use light emitting and light receiving elements as well as the electrical circuitry for driving sensing elements, thus complicating the construction of the tape recorder.

OBJECTS AND SUMMARY OF THE INVENTION

It is an object of the present invention to provide a rotation detecting mechanism for a tape recorder wherein rotation of rotating members or components, such as reel blocks, gears or pulleys may be sensed without resorting to electrical sensing means, power consumption may be lowered, and the power source may be reduced in size.

It is another object of the present invention to provide a rotation detecting mechanism for a tape recorder in which rotation of the rotating members, such as reel blocks, gears or pulleys may be detected accurately despite its simplified construction.

It is yet another object of the present invention to provide a rotation detecting mechanism for a tape recorder wherein reduction in size and weight of the tape recorder may be achieved.

According to the present invention, there are provided a rotation sensing cam member having a cam groove for guiding a movable member of a detecting lever rotationally biased in a direction depending on the rotational direction of the reel block, and a detecting pawl protrusively formed within the cam groove. This cam groove has one edge for guiding the movable member when the detecting lever is rotationally biased in one direction and the other edge for guiding the movable member when the detecting lever is rotationally biased in the other direction. There is provided a cam surface at least at one location in which the movable member guided by the one edge and the movable member guided by the other edge assume the same position. The detecting pawl is provided on the shifting trajectory of the cam surface.

In the rotation detecting mechanism for a tape recorder according to the present invention, when the reel block is at a standstill and the detecting lever is no longer biased rotationally, the movable member of the detecting lever remains at a position to which it has been shifted by the cam surface of the rotation sensing cam member. The halted state of the reel block may be detected by abutment of the detecting pawl on the movable member.

The rotation-sensing cam member is provided with two or more projections for shifting the cam member to said cam surface, so that the movable member can be brought accurately to a position on the shifting trajectory of the detecting pawl without being affected by backlashes or the like of the member or members supporting the detecting lever.

The above and other objects and advantages of the present invention will become more apparent from the following detailed description of preferred embodiments of the present invention, especially when read in conjunction with the accompanying drawings.

DESCRIPTION OF PREFERRED EMBODIMENTS

Figure 1:
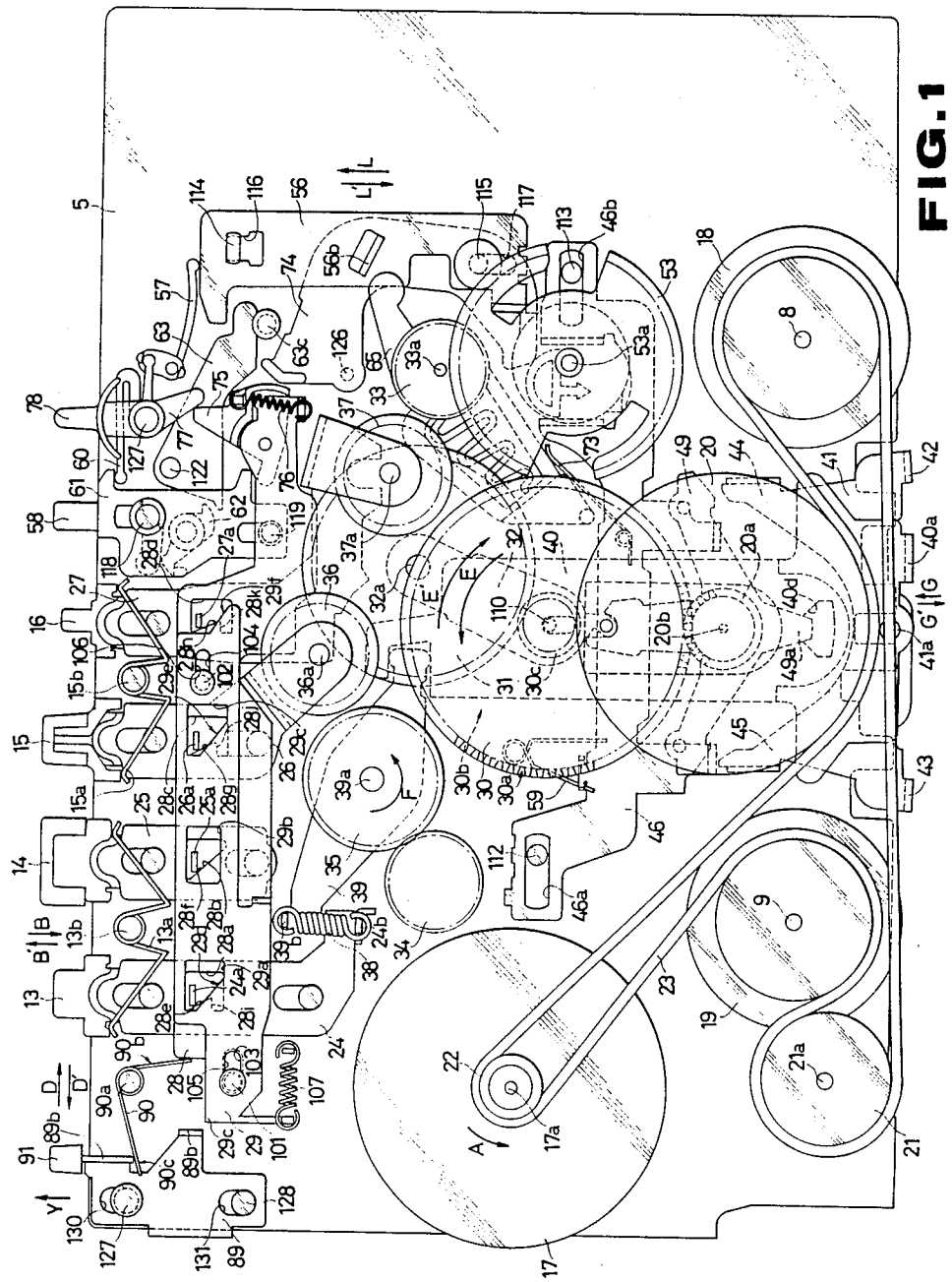
FIG. 1 is a plan view showing the overall lower surface of a chassis base plate of a tape recorder to which the present invention is applied.

By referring to the drawings, illustrative embodiments of the present invention will be explained in detail. In the present embodiment, the present invention is applied to a so-called auto reverse type small size tape recorder making use of a compact cassette.

Figure 2:
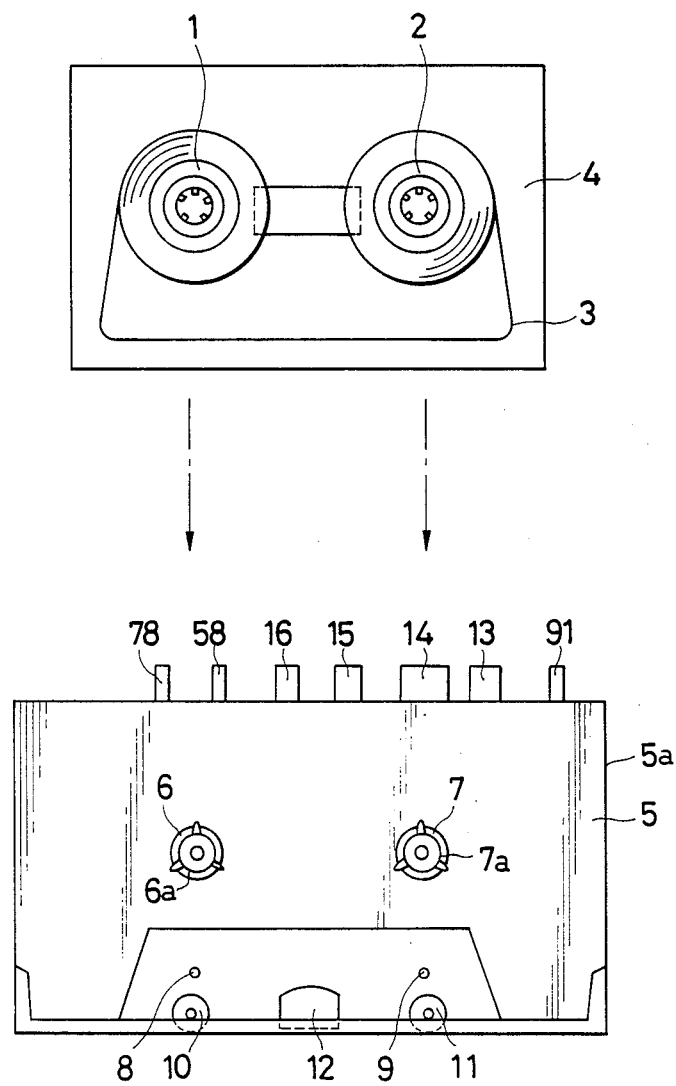
FIG. 2 is a plan view showing the overall upper surface of the chassis base plate of the tape recorder shown in FIG. 1.

Outline of the Tape Recorder Embodying the Present Invention and Tape Running Driving System (FIGS. 1 and 2)

Referring first to FIGS. 1 and 2, the outline of the tape recorder and the tape running driving system will be explained.

In this tape recorder, as shown in FIG. 2, a tape cassette 4 accommodating therein a magnetic tape 3 wound about a pair of reel hubs 1, 2 is mounted horizontally on a tape cassette attachment section 5a provided on the upper surface of a chassis base plate 5. First and second reel blocks 6, 7 and first and second capstan shafts 8, 9 are rotatably supported on the chassis base plate 5, while first and second pinch rolls 10, 11 adapted to be brought into and out of contact with the first and second capstan shafts 8, 9 and a magnetic head 12 acting as a recording/reproducing head are also provided on the chassis base plate 5.

When the tape cassette 4 is attached to the tape attachment section 5a on the chassis base plate 5, the reel hubs 1, 2 of the tape cassette 4 are engaged with the reel engaging shafts 6a, 7a of the reel blocks 6, 7, while the magnetic tape 3 accommodated in the tape cassette 4 is placed on the capstan shafts 8, 9, so that the magnetic head 12 may be brought into sliding contact with the magnetic head 12.

On the front side of a main body of the player 5b, in which the chassis base plate 5 is enclosed, there are provided operating mode select buttons, including a second/reproduce button 13, stop button 14, fast feed button 15 and a rewind button 16.

On the lower side of the base plate 5, a thin flat type driving motor 17 is provided, as shown in FIG. 1, while first and second capstan pulleys 18, 19 used simultaneously as capstan fly wheels are secured to the lower ends of the first and second capstan shafts 8, 9. On the lower side of the chassis base plate 5, an intermediate pulley 20 is rotatably mounted by the medium of a supporting shaft 20b provided on the base plate 5 substantially halfway between the first and second reel blocks 6, 7. An inversion pulley 21 is rotatably mounted by the medium of a support shaft 21a provided on the base plate 5 in juxtaposition to the second capstan pulley 19 disposed on the left-hand side in FIG. 1. The drive power of the motor 17 is transmitted from a drive pulley 22 mounted to the end of a drive shaft 17a of the motor 17 to first and second capstan pulleys 18, 19, intermediate pulley 20 and inversion pulley 21 via an endless belt 23 placed on these pulleys 18 to 21. The belt 23 is formed of a resilient material, such as rubber, and is placed about the drive pulley 22. The belt 23 is extended between the second capstan pulley 19 and the intermediate pulley 20 and is placed about the first capstan pulley 18 and the inversion pulley 21. The belt 23 is extended between the second capstan pulley 19 and the intermediate pulley 20, so that it is wound about the second capstan pulley 19 and the intermediate pulley 20 from the outer peripheral side to transmit the drive power of the motor 17 to the second capstan pulley 19 and to the intermediate pulley 20. When the drive motor 17 is rotationally driven in the direction of the arrow mark A in FIG. 1, the second capstan pulley 19 and the intermediate pulley 18 are rotated clockwise in FIG. 1, while the inversion pulley 21 and the first capstan pulley 18 are rotated counterclockwise in FIG. 1.

The reproducing button 13, stop button 14, fast feed button 15 and the rewind button 16 are provided to the ends of an reproducing lever 24, stop lever 25, fast feed lever 26 and the rewind lever 27, respectively.

The reproducing lever 24, stop lever 25, fast feed lever 26 and the rewind lever 27 are provided on the lower surface of the chassis base plate 5, as shown in FIG. 1, and are mounted for reciprocating in the forward direction shown by the arrow mark B in FIG. 1, and in the reverse direction shown by the arrow mark B' in FIG. 1, with respect to the chassis base plate 5. The levers 24, 25, 26 and 27 are biased to be protruded in the reverse direction shown by the arrow mark B' in FIG. 1, that is, from the upper side edge in FIG. 1 of the chassis base plate 5 towards outside of the chassis base plate 5, by torsion coil springs 13a and 15a supported respectively by supporting pins 13b and 15b provided upright on the lower surface of the chassis base plate 5. A locking plate 28 is provided on the levers 24, 25, 26 and 27 for interconnecting these levers 24 to 27. This lock plate 28 is mounted in the directions shown by the arrow marks D and D' in FIG. 1, that are orthogonal to the shifting direction of the levers 24 to 27, that is, in the left and right horizontal directions in FIG. 1, with slide guide pins 101, 102 mounted upright on the chassis base plate 5 inserted into and carried within elongated openings 103, 104 each having its longer axis extending along the longitudinal direction. The locking plate 28 has engaging openings 28a, 28b, 28c and 28d into which are respectively engaged pawls 24a, 25a, 26a, 27a, that are provided to the levers 24, 25, 26, 27, respectively. The locking plate 28 is also biased by a torsion coil spring 90 mounted by a supporting pin 90a in turn mounted on the chassis base plate 5 so as to be shifted in the direction of the arrow mark D in FIG. 1. Within the engaging openings 28a, 28b, 28c, 28d in the locking plate 28, there are formed inclined guides 28e, 28f, 28g, 28h abutting on the associated pawls 24a, 25a, 26a, 27a, such that, by the shifting operation along the forward direction of the arrow mark 8 in FIG. 1, which is the direction of inserting the levers 24 to 27 with respect to the chassis base plate 5, the locking plate 28 is shifted in the direction of the arrow mark D' in FIG. 1 against the force of the torsion coil spring 90. Within the engaging openings 28a, 28c, 28d, associated with the pawls 24a, 26a, 27a of the reproducing lever 24, fast feed lever 26 and the rewind lever 27, there are provided retaining pawls 28i, 28j, 28k adapted to be engaged with the pawls 24a, 26a, 27a, respectively. When moved in the forward direction shown by the arrow mark B in FIG. 1, which is the inserting direction with respect to the chassis base plate 5, the reproducing lever 24, fast feed lever 26 and the rewind lever 27 are locked with the pawls 24a, 26a, 27a thereof retained by the retaining pawls 28i, 28j, 28k, respectively. Meanwhile, the locked state of the reproducing lever 24, fast feed lever 26 and the rewind lever 27 is released when the stop lever 25 is shifted in the inserting direction thereof with respect to the chassis base plate 5, that is, in the forward direction shown by the arrow mark B in FIG. 1.

On the locking plate 28, there is provided a switch plate 29 so as to overlie the locking plate 28. This switch plate 29 is mounted for reciprocating along the directions shown by the arrow marks D and D' in FIG. 1, orthogonal to the shifting direction of the levers 24, 25, 26, that is, in the left and right horizontal directions in FIG. 1, by having slide guide pins 101, 102 supporting the locking plate 28 inserted into and supported within elongated openings 105, 106 each having its long axis extending in the longitudinal direction. The switch plate 29 is mounted by having the pawls 24a, 25a, 26a engaging in engaging openings 29a, 29b, 29c bored in association with the pawls 24a, 25a, 26a, that are provided in the levers 24, 25, 26, respectively. The switch plate 29 is biased by the tension spring 107 so as to be shifted in the direction shown by the arrow mark D in FIG. 1, that is, in the same direction as that for the locking plate 28. Inclined guide surface sections 29d, 29e are provided within those engaging openings 29a and 29c among the engaging openings 29a, 29b, 29c in the switch plate 29 that are associated with the pawls 24a and 26a of the reproducing lever 24 and fast feed lever 26. An inclined guide surface section 29f is provided at one end of the switch plate 29 facing to the pawl 27a of the rewind lever 27 of the switch plate 29. The switch plate 29 is shifted along with the locking plate 28 in the direction of the arrow mark D' in FIG. 1, against the bias of the tension spring 107, by being shifted in the forward direction shown by the arrow mark B in FIG. 1, that is, in the direction of inserting one of the reproducing lever 24, fast feed lever 26 or the rewind lever.

When one of the reproducing lever 24, fast feed lever 26 and the rewind lever is thrustedly actuated in the direction shown by the arrow mark B in FIG. 1 and the switch plate 29 is shifted in the direction shown by the arrow mark D' in FIG. 1, the start switch, not shown, is actuated. By the actuation of the start switch the electric power is supplied to the drive motor 17 or the reproducing circuit or recording/reproducing circuit for rotating the drive motor 17 and actuating the reproducing or recording/reproducing circuit, not shown, connected to the magnetic head 12. By the driving of the driving motor 17, the first and second capstan pulleys 18, 19 and the intermediate pulley 20 are rotationally driven by the medium of the belt 23. It is noted that the first and second capstan pulleys 18, 19 are driven rotationally in mutually opposite directions. The intermediate pulley 20 is coaxially integrally formed with a small diameter gear section 20a meshing with a first gear section 30a of a cam gear 30 attached to the lower surface of the chassis base plate 5. This cam gear 30 is carried by a supporting shaft 110 mounted upright on the chassis base plate 5, and is mounted rotatably on the lower side of the chassis base plate 5.

The cam gear 30, mounted to the chassis base plate 5 as described above, has the first gear section 30a formed on its outer periphery, and is provided on its planar surface 30b with a cam groove 71 constituting a tape end detecting mechanism, as subsequently described. The cam gear 30 is provided centrally with a second small-diameter gear section 30c, which is mounted coaxially to the cam gear 30 with the intermediary of a friction member, as shown in FIG. 1. This second gear section 30c meshes with an intermediate gear 31. This intermediate gear is rotatably supported by a supporting shaft 32a mounted upright on the end of an intermediate gear supporting lever 32 turnably mounted about a supporting shaft 110 carrying the cam gear 30 as center. That is, this intermediate gear 31 is shiftedly actuated by the turning of the intermediate gear supporting lever 32 as the gear 31 meshes with the second gear section 30c of the cam gear 30. When the reproducing lever 24 is thrustedly actuated in the direction shown by the arrow mark B in FIG. 1, this intermediate gear supporting lever 32 is turned in the direction shown by the arrow mark E or E' in FIG. 1 by a normal-reverse changeover device as subsequently described.

Since the friction member is interposed between the first and second gear sections 30a and 30c of the cam gear 30, when the member or section rotated in meshing with the second gear section 30c offers a lesser rotational resistance, the second gear section 30c is rotated with the rotation of the drive motor 17. However, when the member or section rotated in meshing with the second gear section 30c offers a larger rotational resistance, the second gear section 30c is not rotated with rotation of the drive motor 17.

The first and second reel blocks 6, 7 are coaxially provided with first and second reel block gears 33, 34 on the lower surface of the chassis base plate 5. The second reel block gear 34 mounted to the second reel block 7 meshes with an inversion gear 35. When the reproducing gear 24 is thrustedly actuated in the forward direction shown by the arrow mark B in FIG. 1, the intermediate gear 31 is moved between the first reel block gear 33 and the inversion gear 39, by the rotation of the intermediate gear supporting lever 32, so as to be engaged selectively with the first reel block gear 33 or the inversion gear 35. Thus, as the drive motor 17 is driven rotationally, one of the first and the second reel blocks 6, 7 is driven rotationally in a predetermined direction and the reel hubs 1, 2 engaging with these reel blocks 6, 7 are thereby rotated to take up the magnetic tape 3 in the normal or reverse direction.

At the chevron-shaped end of the fast feed lever 26, there is rotationally mounted a fast feed idle gear 36 by the intermediary of a supporting shaft 36a mounted thereat. When the fast feed lever 26 is thrustedly actuated in the direction of the arrow mark B in FIG. 1 and shifted in the forward position, the fast feed idle gear 36 meshes with the inversion gear 35 and the first gear section 30a of the cam gear 30 simultaneously. That is, when the fast feed button 15 is thrustedly actuated in the direction of the arrow mark B in FIG. 1, and the drive motor 17 is thereby driven rotationally, the rotation of the first gear section 30a of the cam gear 30 is transmitted via fast feed idle gear 36 to the inversion gear 35, so that the other reel block 7 is driven rotationally at an elevated speed.

Similarly, at the chevron-shaped end of the rewind lever 27, there is rotatably mounted a rewind idle gear 37 with the intermediary of a supporting shaft 37a mounted. When the rewind lever 27 is thrust in the direction of the arrow mark B in FIG. 1 and thereby shifted in the forward position, the rewind idle gear 37 meshes with the first reel block gear 33 and the first gear section 30a of the cam gear 30 simultaneously. That is, when the rewind button 16 is thrustedly actuated in the direction of the arrow mark B in FIG. 1 and the drive motor 17 is driven rotationally, the rotation of the first gear section 30a of the cam gear 30 is transmitted to the first reel block gear 33 through the rewind idle gear 37, so that the first reel block 6 is driven rotationally at an elevated speed.

Normal-Reverse Changeover Device

Figure 3:
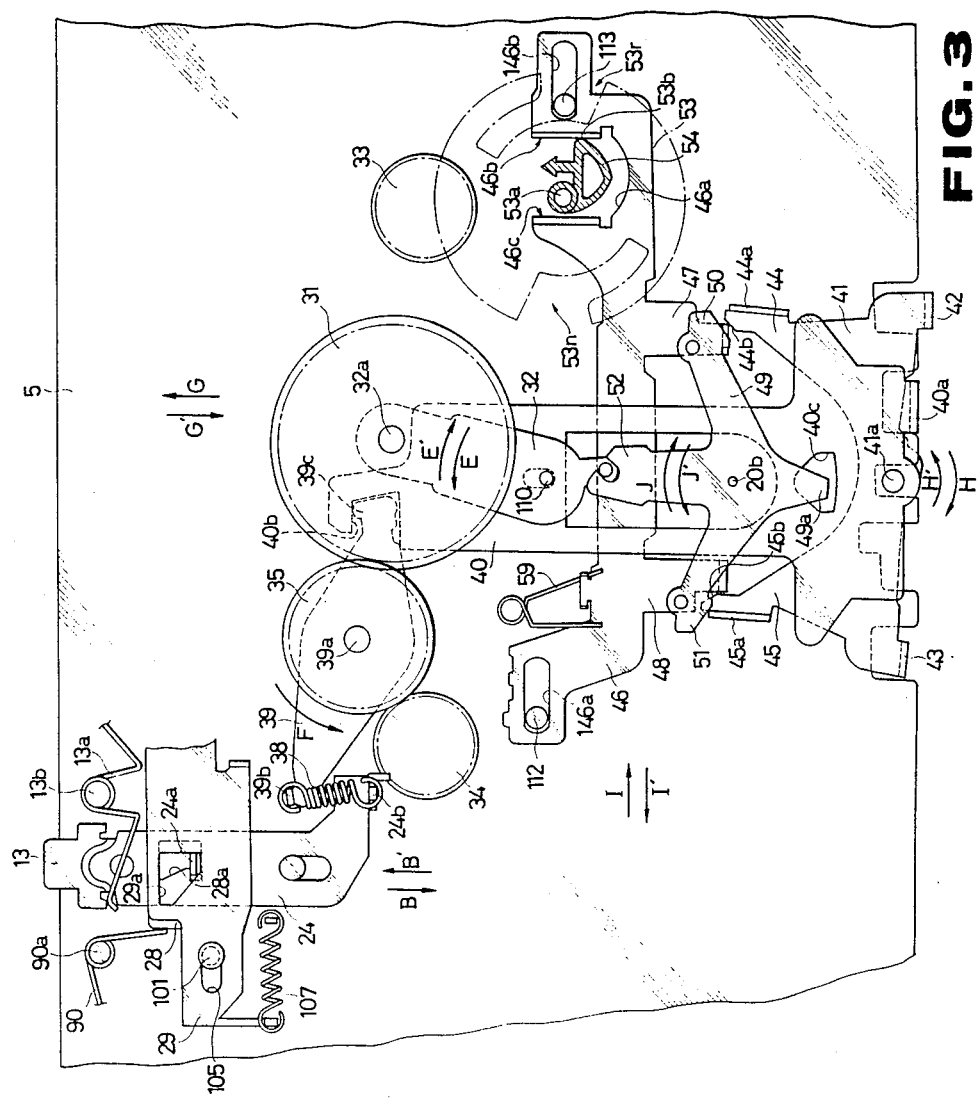
FIG. 3 is a plan view showing the normal-reverse switching mechanism in the normal state of the tape recorder shown in FIG. 1.
Figure 4:
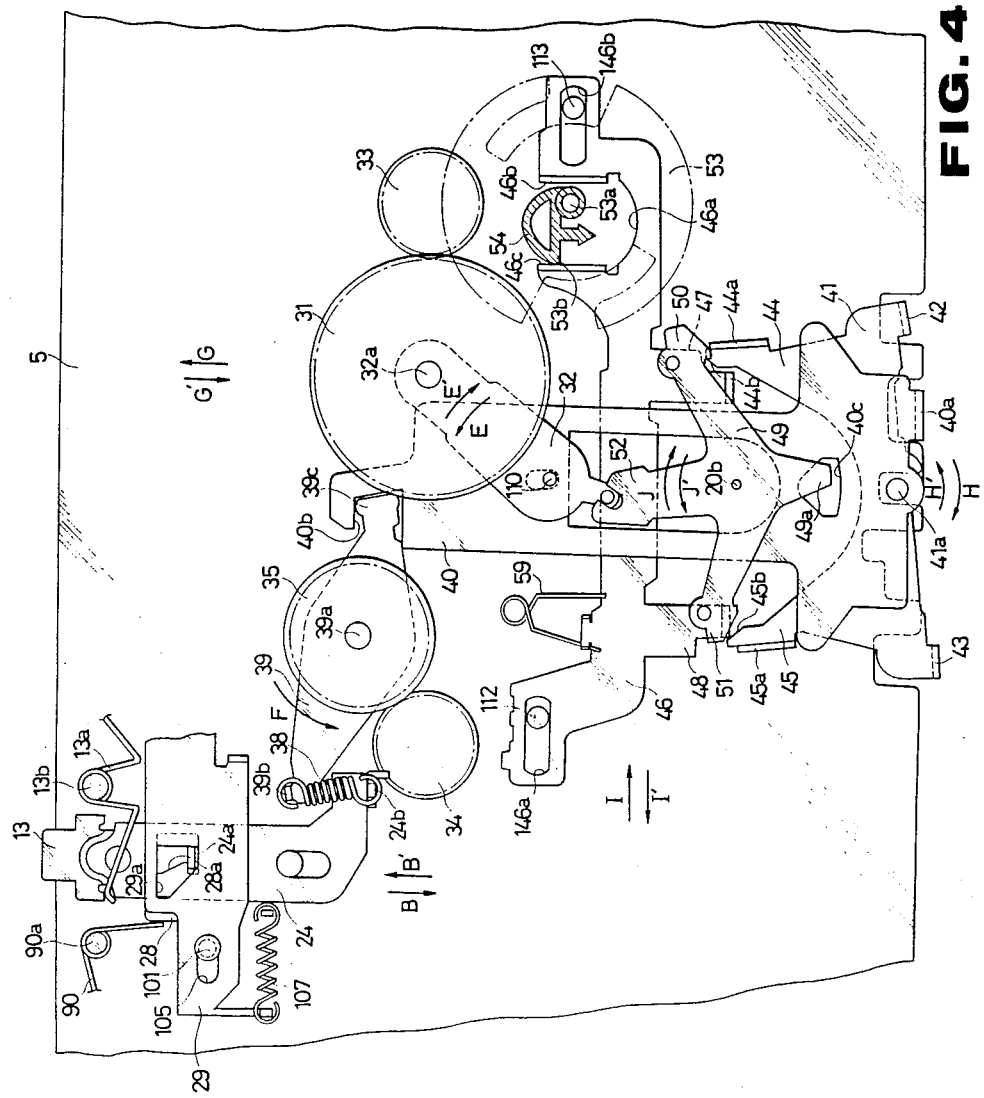
FIG. 4 is a plan view showing the normal-reverse switching mechanism in the reverse state of the tape recorder shown in FIG. 1.

Referring now to FIGS. 1, 3 and 4, the normal-reverse changeover device is explained.

To the L-shaped end of the reproducing lever 24, towards the inner side of the chassis base plate 5, there is connected a transmission lever 39 by the medium of a limiting spring 38, as shown in FIG. 3. The transmission lever 39 is carried by a supporting shaft 39a mounted upright on the lower surface of the chassis base plate 5 so as to be turned about the shaft 39a as center. A spring retainer 39b for the limiting spring 38 is formed at one end of the transmission lever 39, while an engaging section 39c engaging with a recess 40b on one lateral side of a magnetic head shifting lever 40 is formed at the other end of the lever 39. The lever 39 is connected to the reproducing lever 24 by the limiting spring 38 installed under tension between the spring retainer 39b and the spring retainer 24b formed at the end of the reproducing lever 24. Since a tension spring is used as the limiting spring 38, when the reproducing lever 24 is thrustedly actuated in the direction shown by the arrow mark B in FIG. 1 and thereby shifted in the forward direction, the transmission lever 39 is turned counterclockwise as shown by the arrow mark F in FIG. 3, under the force of the limiting spring 38, about the supporting shaft 39a as center, so as to follow up with the forward movement of the reproducing lever 24. The purpose of the limiting spring 38 is to prevent an excess force from being applied to the transmission lever 39 by that the spring 38 is extended when the thrust force is further applied to the reproducing lever 24 in the forward direction shown by the arrow mark B in FIG. 3 after the transmission lever 39 has been turned to and positioned at a predetermined position as later described. By such rotation of the transmission lever 39, the engaging portion 39c formed at the other end of the transmission lever 39 is similarly turned counterclockwise in the direction shown by the arrow mark F in FIG. 3 to shift the magnetic head shifting lever 40 in the direction shown by the arrow mark G in FIG. 3.

Meanwhile, the magnetic head shifting lever 40 is mounted on the lower surface of the chassis base plate 5 so as to be reciprocated in the same reciprocating directions as those for the reproducing lever 24, stop lever 25, fast feed lever 26 and the rewind lever 27, that is, in the directions shown by the arrow marks G and G' in FIGS. 1 and 3, so that the shifting lever 40 is reciprocated in the directions shown by the arrow marks G and G' by the turning movement of the transmission lever 39. At the other end of the magnetic head shift lever 40, there is mounted a magnetic head engaging pawl 40a, as shown in FIGS. 1 and 3. As described subsequently, the magnetic head engaging pawl 40a is engaged with the rotatably supported magnetic head 12. That is, as the reproducing lever 24 is shifted in the forward direction, as indicated by the arrow mark B in FIG. 3, the magnetic head 12 is moved towards the inside of the tape cassette 4 and into contact with the magnetic tape 3 to establish the reproducing mode.

To this magnetic head shifting lever 40, there is rotatably mounted a pinch roll shifting lever 41 by the intermediary of a supporting shaft 41a mounted upright on the shift lever 40. This pinch roll shifting lever 41 is provided with first and second pinch engaging pawls 42, 43 and first and second abutting arms 44, 45 with the supporting shaft 41a as center. In the reproducing mode, the pinch roll shifting lever 41 is turned in the direction shown by the arrow mark H or H' in FIG. 3, so that the associated side of the first or second pinch roll 10, 11 supported so as to be brought into or out of contact with the first or second capstan shaft 8 or 9 as later described is moved into abutment with the first or second capstan shaft 8 or 9 through one of the first and second pinch roll engaging pawls 42 and 43. The magnetic tape 3 is extended between the first and second pinch rolls 10, 11 and the first and second capstan shafts 8, 9 and is clamped by one of the first and second pinch rolls 10 and 11 abutting on the associated one of the first and second capstans 8 and 5. The magnetic tape 3 is fed depending on the direction of rotation of the first or second capstan shafts 8 and 9 abutted by the first or second capstan shafts 8, 9.

The direction of rotation of the pinch roll shift lever 41 is controlled by a changeover lever 46. As shown in FIG. 3, this changeover lever 46 is mounted for reciprocating in the direction shown by the arrow mark I or I' in FIG. 5, as it is guided by the slide guide pins 112, 113, by that the slide guide pins 112, 113 mounted upright on the lower surface of the chassis base plate 5 are inserted into and supported within the slide guide openings 146a, 146b, each having its long axis extending in the longitudinal direction. The changeover lever 46 is provided first and second abutting projections 47, 48 abutting on first and second abutting arms 44, 45 of the pinch roll shifting lever 41. Thus, in the reproducing mode, when the changeover lever 46 is shifted towards the one side indicated by the arrow mark I in FIG. 3, the first abutting arm 44 and the first abutting projection 47 abut on each other so that the pinch roll shifting lever 41 is turned clockwise in the direction of the arrow mark H about the supporting shaft 41a as center. In this manner, the second pinch roll engaging pawl 43 causes the second pinch roll 11 to be shifted in a direction in which it abuts on the other side second capstan shaft 9. On the other hand, when the changeover lever 46 has been shifted towards the other side indicated by the arrow mark I' in FIG. 4, the other side second abutting arm 45 and the other side second abutting projection 48 abut on each other to cause the pinch roll shifting lever 41 to be turned counterclockwise as indicated by the arrow mark H' in FIG. 4, such that the first pinch roll engaging pawl 42 causes the first pinch roll 10 to shift in a direction in which it is abutted on the one side first capstan shaft 8.

As the ends of the first and second abutting arms 44, 45 of the pinch roll shifting lever 41, there are provided first and second engaging pawls 44a, 45a, respectively.

When the magnetic head shift lever 40 is shifted in the direction shown by the arrow mark G in FIGS. 3 and 4 by the thrusting operation of the reproducing lever 24 in the forward direction shown by the arrow mark B in FIGS. 3 and 4, the engaging pawls 44a, 45a abut on the ends of first and second arms 50, 51 projectedly mounted to the both sides of the intermediate gear shifting lever 49 turnably mounted about a supporting shaft 20b mounted in turn on the lower surface of the chassis base plate 5. This intermediate gear shifting lever 49 is rotationally actuated, by abutment of the first and second engaging pawls 44a, 45a with the first and second arms 50, 51, so as to follow up with rotation of the pinch roll shifting lever 41. On one side of the intermediate gear shifting lever 49, there is provided an engaging arm 52 engaging with the lever 32. That is, when the shifting lever 49 is turned in the direction shown by the arrow mark J or J' in FIGS. 3 and 4, about the supporting shaft 20b as center, the lever 32 is also turned responsive thereto in the direction shown by the arrow mark E or E' in FIGS. 3 and 4, about the supporting shaft 110 as center, so as to be shifted in a direction in which the intermediate gear 31 mounted to the end of the intermediate gear supporting lever 32 meshes with the inverting gear 35 or with the reel block gear 33.

When the reproducing lever 24 is thrustedly actuated in the forward direction shown by the arrow mark B in FIGS. 3 and 4, the reproducing lever 24 is shifted slightly in the forward direction so as to be retained subsequently after the magnetic head shifting lever 40 is positioned following the regulation of the movement of the magnetic head shifting lever 40 in the upward direction as indicated by the arrow mark G in FIG. 1. When the magnetic head shifting lever 40 is positioned and retained, the movement of the transmission lever 39 is also terminated. Thus, when the reproducing lever 24 is retained at the forward position in which it has been thrustedly actuated in the direction shown by the arrow mark B in FIGS. 3 and 4, the limiting spring 38 is extended slightly for biasing the magnetic head shifting lever 40 to be moved further upward as indicated by the arrow mark G in FIG. 3. The magnetic head shifting lever 40 is positioned by controlling the shifting of the pinch roll shifting lever 41 by the switch lever 46 and by the intermediate gear shifting lever 49 the turning of which is controlled in operative association with the intermediate gear 31 meshing with a predetermined gear. The bias of the limiting spring 38 applied to the magnetic head shifting lever 40 is transmitted via pinch roll shifting lever 41 to the intermediate gear shifting lever 49 and to the changeover lever 46. The biasing force transmitted to the intermediate gear shifting lever 49 is transmitted via intermediate gear supporting lever 32 to the intermediate gear 31. When the intermediate gear 31 is to be physically separated from the inverting gear 35 or from the first reel block gear 33 meshing with the gear 31, the magnetic head shifting lever 40 is necessarily moved against the biasing force of the limiting spring 38. In this manner, the intermediate gear 31 is not separated physically from the inverting gear 35 or from the first reel block gear 33 meshing with the intermediate gear 31.

The intermediate gear shifting lever 49 is provided with a rotation control pawl 49a engaging in a sector-shaped opening 40c in the magnetic head shifting lever 40. In the reproducing mode, the rotation control pawl 49a is engaged in an larger diameter portion of the sector-shaped opening 40c, so that the intermediate gear shifting lever 49 may be turned in the direction indicated by the arrow marks J or J' in FIG. 3 with the supporting shaft 113 as center. Thus the supporting lever 32 having its other end engaged in the engaging arm 52 of the intermediate gear shifting lever 49 is also turned to follow up with the rotation of the intermediate gear shifting lever 49 so that the intermediate gear 31 attached to one end of the intermediate gear shifting lever 49 will be engaged with the reel block gear 33 or with the inverting gear 35.

In other than the reproducing mode, that is, when the reproducing lever 24 is shifted in the reverse direction as indicated by the arrow mark B' in FIGS. 1 and 3 so that the magnetic head shifting lever 40 is moved in the direction shown by the arrow mark G' in FIGS. 1 and 3 so as to be returned to its original position, the rotation control pawl 49a is engaged in the lesser diameter portion of the sector shaped opening 40c to control the turning of the intermediate gear shifting lever 49 and that of the intermediate gear supporting lever 32 connected to the shifting lever 49, such that the intermediate gear 31 mounted to one end of the supporting lever 32 is not engaged with the first reel block gear 33 nor with the inverting gear 35.

Meanwhile, the changeover lever 46 is controlled in its position as a function of the rotational position of an interrupted changeover gear 53. This gear 53 is turnably mounted at a position of meshing with the first gear section 30a of the cam gear 30 by the medium of a supporting shaft 53a mounted upright on the chassis base plate 5, and is provided with first and second interrupted portions 53n, 53r, at two positions displaced by 180° from each other. This changeover interrupted gear 53 is provided with an offset cam section 54 engaging in an engaging recess 46a formed on one side end of the changeover levers 46. When the changeover interrupted gear 53 is in its normal position, that is, when the first interrupted portion 53n faces to the first gear section 30a of the cam gear 30, with the interrupted gear 53 not meshing with the cam gear 30, as shown in FIG. 3, the offset cam section 54 abuts on an upright inner lateral side 46b of the recess 46a on the right-hand side in FIG. 3 for positioning the switch lever 46 at one position or normal position shifted in the direction shown by the arrow mark I in FIG. 3. When the changeover interrupted gear 53 is in the reverse position, as shown in FIG. 3, that is, when the second interrupted portion 53r faces to the first gear section 30a of the cam gear 30, with the changeover interrupted gear 53 not meshing with cam gear 30, the offset cam section 54 abuts on the other upright inner lateral side 46c of the recess 46a towards left in FIG. 4 for positioning the changeover lever 46 at the other or second position or reverse position shifted in the direction indicated by the arrow mark I' in FIG. 4.

With the changeover interrupted gear 53 positioned in the above normal or reverse position, the changeover lever 46 is also positioned in the first or normal position or in the second or reverse position, so that the pinch roll shifting lever 41 is selectively turned in the direction shown by the arrow mark H or H' in FIGS. 3 and 4. In this manner, the recording or reproduction in the normal or reverse direction is performed, in which the second or the first pinch rolls 11, 10 is abutted on the second or first capstan shafts 8, 9, respectively.

On one planar surface of the changeover interrupted gear 53, there are formed first and second positioning projections 55n 55r at two positions spaced by 180° from each other.

These projections 55n, 55r are selectively abutted on a trigger lever 56 and biased to be turned by a trigger mechanism as later described in a direction of being thrusted on the trigger lever 56 for positioning the gear 53 in the normal or reverse position.

Trigger Mechanism (FIGS. 1 and 5 to 8)

The trigger mechanism will be explained by referring to FIGS. 1 and 5 to 8.

Figure 5:
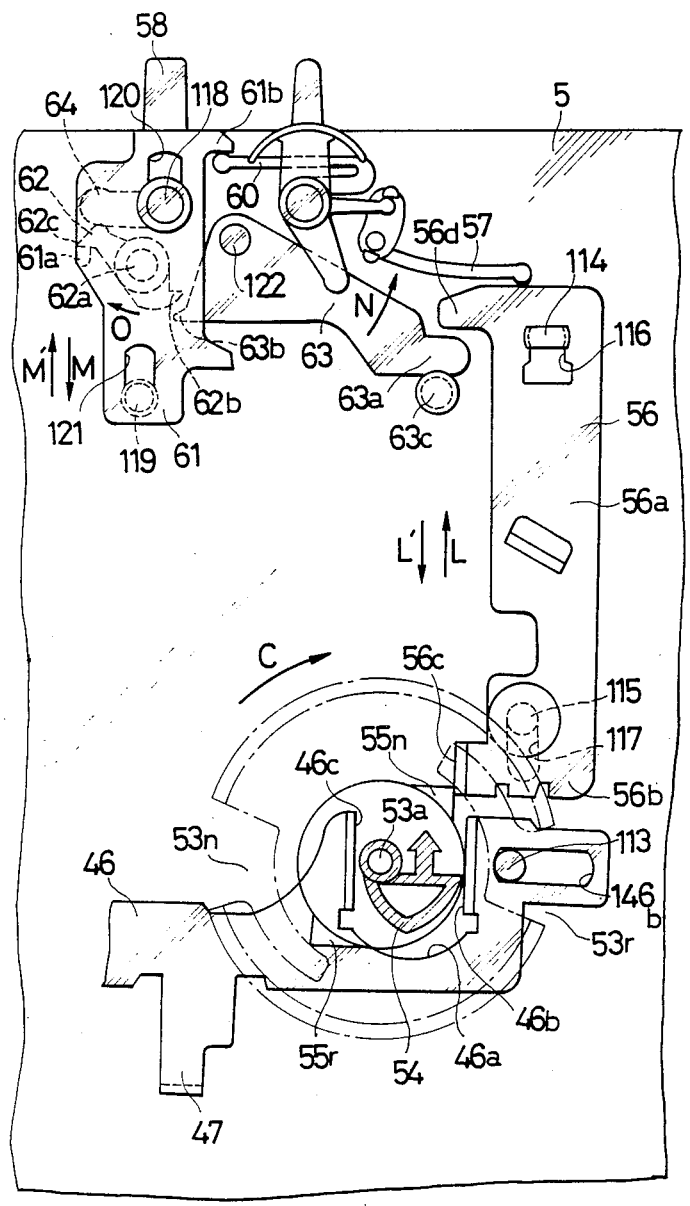
FIG. 5 is a plan view showing a trigger mechanism of the tape recorder shown in FIG. 1.

The trigger lever 56 constituting the trigger mechanism is formed substantially in the form of a letter L, as shown in FIGS. 1 and 5, and is mounted for movement in the reverse direction indicated by the arrow mark L' in FIGS. 1 and 5 and in the forward direction indicated by the arrow mark L in FIGS. 1 and 5, as a pair of slide guide shafts 114, 115 mounted upright on the lower surface of the chassis base plate 5 are engaged in slide guide openings 116, 117 formed in a main body 56a of the trigger lever 56 and each having its longer axis extending in the longitudinal direction of the main body 56a and as the slide guide shafts 114, 115 are guided within the slide guide openings 116, 117. The trigger lever 56 is biased by a first spring plate 57 attached to the chassis base plate 5 in the return direction indicated by the arrow mark L' in FIG. 5. The trigger lever 56 has its abutment edge 56c at the end of a bent portion 56d on one end of the main body 56a abutting on and engaging with one of the positioning projections 55n, 55r of the changeover interrupted gear 53.

The trigger lever 56 is shifted in the reciprocating direction indicated by the arrow mark L' or L in FIG. 5 by a changeover lever 61 reciprocably mounted to the chasis base plate 5 in juxtaposition to the reproducing lever 24, stop lever 25, fast feed lever 26 and the rewind lever 27, and a trigger transmission lever 63 turned by the thrusting operation of the changeover lever 61. When the changeover lever 61 is thrusted and slid in the forward direction indicated by the arrow mark L in FIG. 5, the trigger lever 56 has its abutment edge 56d positioned along the outer periphery of a rotationary trajectory of the first and second positioning projections 55n, 55r.

When in the above normal or reverse position, the changeover interrupted gear 53 has its first or second positioning projections 55n, 55r biased to be turned clockwise as indicated by the arrow mark C in FIG. 5, that is, in a direction of thrusting the abutment edge 56c of the trigger lever 56. Thus the arrangement is so made that, as shown in FIGS. 3 and 4, when the changeover interrupted gear 53 is in the above normal or reverse position, a straight line interconnecting an abutting point between the end abutment 53b of the offset cam section 54 and the one upright inner lateral side 56b or the other upright inner lateral side 46c of the engaging recess 46a of the changeover lever 46 and the center of the supporting shaft 53a which is the center of rotation of the changeover interrupted gear 53 does not run parallel to the reciprocating direction of the changeover lever 46. This changeover lever 46 is biased to be moved towards a neutral position by a torsion spring 59 mounted to the chassis 5. Thus the changeover interrupted gear 53 is perpetually biased by the changeover lever 46 so as to be turned in the direction shown by the arrow mark C in FIG. 5.

In the reproducing mode, the changeover lever 46 is biased towards its neutral position not only under the bias of the torsion spring 59 and the limiting spring 38 but also by biasing means operating to bias the first and second pinch rolls 10, 11 to be displaced away from the associated first and second capstan shafts 8, 9. Thus, when the reproducing lever 24 is moved forward and retained, as described hereinabove, the changeover lever 46 cooperates with the intermediate gear shifting lever 49 to control the turning of the pinch roll shifting lever 41 for positioning the magnetic head shifting lever 40 at a position to which it has been shifted in the direction indicated by the arrow mark G in FIG. 1. The biasing force of the limiting spring 38, applied to the magnetic head shifting lever 40, is transmitted by way of the pinch roll shifting lever 41 to the changeover lever 46. Those portions of the first and second abutment arm sections 44, 45 of the pinch roll shifting lever 41 that are abutted by the first and second abutment projections 47, 48 are formed as inclined surface 44b, 45b, so that the limiting spring 38 acts to bias the changeover lever 46 to its neutral position. On the other hand, the pinch roll shifting lever 41 is biased towards a neutral point of rotation under the bias acting to shift the first and second pinch rolls 10, 11 in a direction away from the associated first and second capstan shafts 8, 9. Similarly to the bias afforded by the limiting spring 38, this bias acts to shift the changeover lever 46 towards its neutral position.

The changeover interrupted gear 53 is rotationally biased, as described above, when in the above normal or reverse position, so that it is turned slightly when the trigger lever 56 is slid in the forward direction shown by the arrow mark L in FIG. 5. At this time, the first and second interrupted portions 53n, 53r of the interrupted gear 53 are shifted away from the position of facing to the first gear section 30a of the cam gear 30, with the interrupted gear 53 meshing with the first gear section 30a. At this time, since the first gear section 30a is driven rotationally by the drive motor 17, the changeover interrupted gear 53 is rotationally driven in the direction shown by the arrow mark C in FIG. 5 and positioned after being turned through 180° by abutment of one of the abutment projections 55n, 55r with the abutment edge 56c of the trigger lever 56. In this manner, the normal position and the reverse position for the reproducing or recording mode are interchanged by the turning through 180° of the changeover interrupted gear 53 and thereby the changeover lever 46 being shifted from the first position shifted as shown by the arrow mark I in FIG. 3 to the second position shifted as shown by the arrow mark I' in FIG. 4, or from the second position shifted in the direction shown by the arrow mark I' in FIG. 4 to the first position shifted in the direction shown by the arrow mark I in FIG. 3.

The changeover lever 61 adapted for reciprocating the trigger lever 56 in the direction shown by the arrow mark L in FIG. 5 is mounted for reciprocation in the direction shown by the arrow mark M or M' in FIG. 5, with respect to the chassis base plate 5, with a pair of slide guide shafts 118, 119 on the chassis base plate 5 engaging in slide guide openings 120, 121 of the lever 61 each having its longer axis extending lengthwise of the lever 61. The trigger lever 61 is biased by a second spring plate 60 mounted to the chassis base plate 5 so as to be shifted in the returning direction shown by the arrow mark M' in FIG. 5. Thus the trigger lever 61 has an engaging portion 61b on its lateral side engaging with the end of the spring plate 60, so that the lever 61 is biased to be shifted by the spring plate 60 in the returning direction shown by the arrow mark M' in FIG. 5. A changeover button 58 is also mounted to one end of the trigger lever 61.

Figure 6:
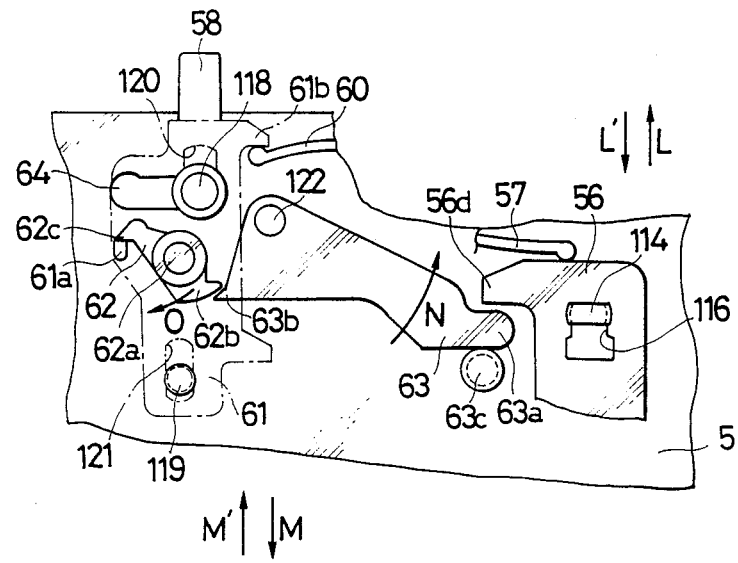
FIG. 6A is a plan view showing essential parts of the trigger mechanism upon starting the triggering operation.
FIG. 6B is a plan view showing essential parts of the trigger mechanism in the course of the triggering operation.
Figure 6:
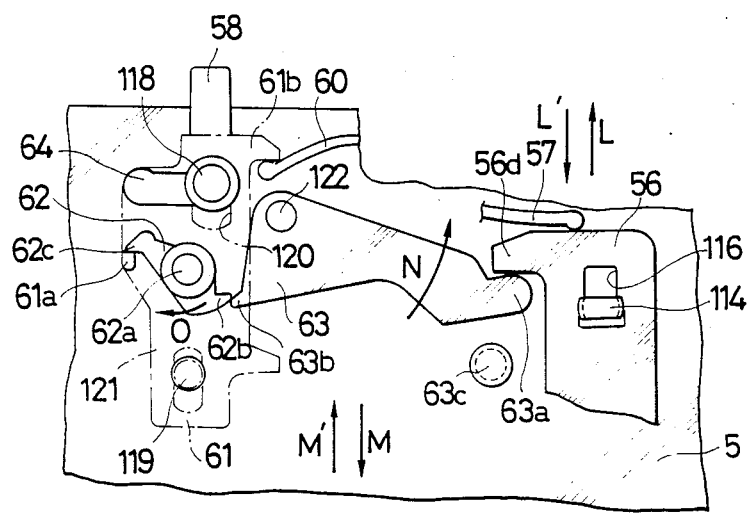
Figure 7:
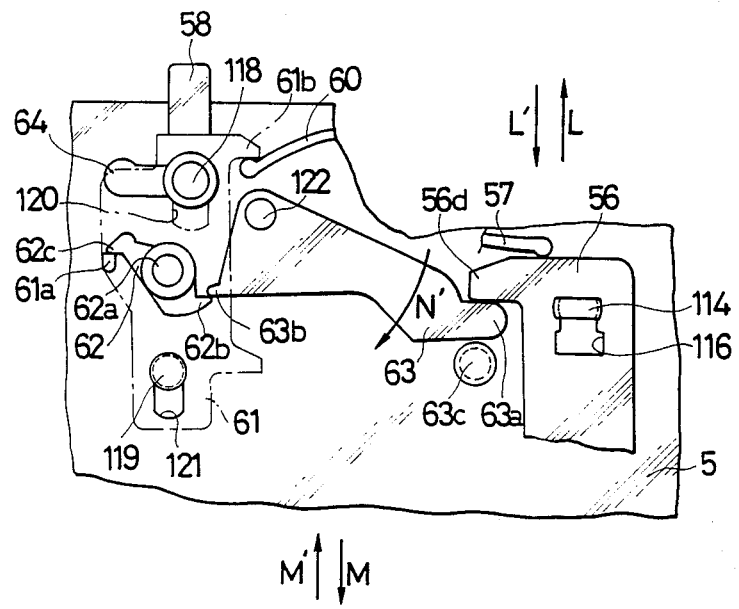
FIG. 7A as a plan view showing essential parts of the trigger mechanism, with the triggering operation being terminated.
FIG. 7B is a plan view showing the essential parts of the trigger mechanism in the course of the returning operation.
Figure 7:
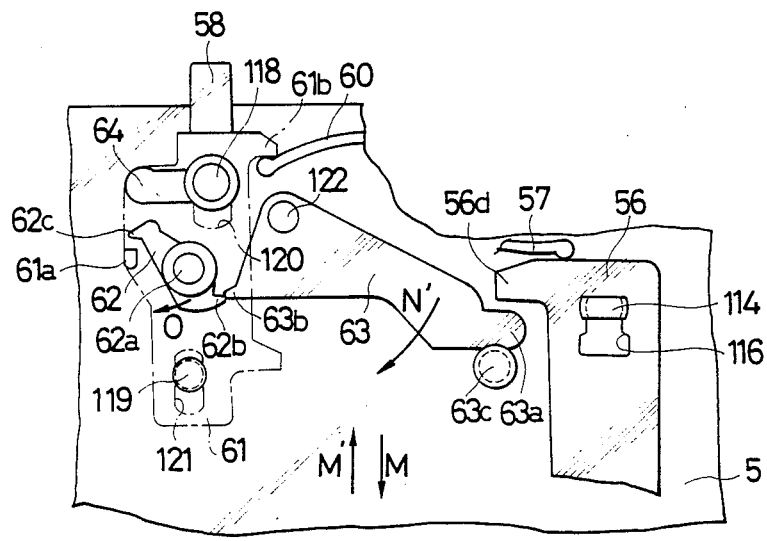
Figure 8:
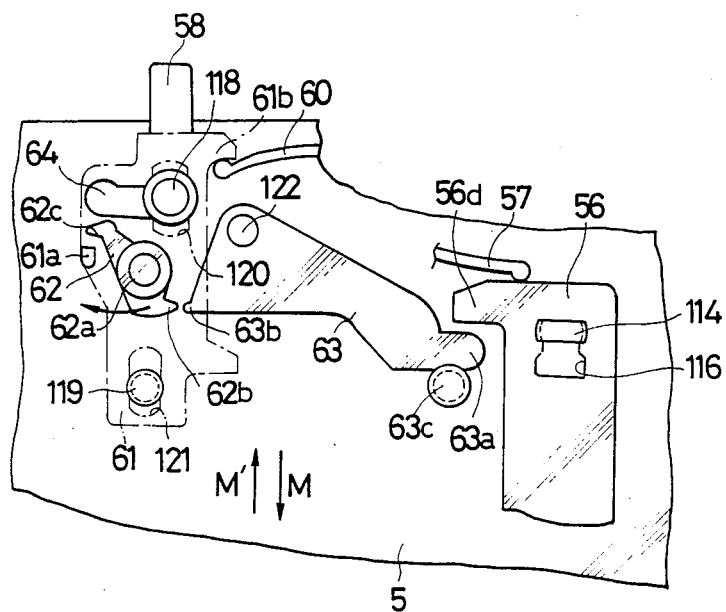
FIG. 8 is a plan view showing the essential parts of the trigger mechanism as the end of the restoration operation is approached.

On the trigger 61, a changeover transmission lever 62 is turnably mounted by the medium of a supporting shaft 62a mounted upright on the lever 61. On thrusting the trigger lever 61, the changeover transmission lever 62 is abutted and engaged by the trigger transmission lever 63 turnably mounted via a supporting shaft 122 mounted upright on the chassis base plate 5, as shown in FIG. 6A. This trigger transmission lever 63 has its abutment section 63a facing to the bent portion 56d projectingly mounted to the other side of the trigger lever 56 which is biased in the returning direction shown by the arrow mark L' in FIG. 5 by the first spring plate 57 attached to the chassis base plate 5 as previously described. The trigger transmission lever 63 is positioned as it is controlled in its rotation in the direction opposite to that indicated by the arrow mark N in FIG. 5 by the abutment section 63a abutting on and engaging with a retaining pin 63c facing to the bent portion 56d. The trigger transmission lever 63 having its abutment section 63a facing to the bent portion 56d of the trigger lever 56 is turned by the medium of the changeover transmission lever 62 as indicated by the arrow mark N in FIG. 5 by the trigger lever 61 being thrustedly actuated in the direction shown by the arrow mark M in FIG. 6. The trigger transmission lever 63 causes the trigger lever 56 to be shifted in the direction shown by the arrow mark L' in FIG. 5. The changeover transmission lever 62 has its lever abutment section 62b at its one end facing to an abutment section 63b formed at one end of the trigger transmission lever 63 towards the direction shown by the arrow mark M in FIG. 5 which is the forward direction of the reciprocation of the changeover lever 61. The changeover transmission lever 62 has a rotation control section 62c at its other end abutting on a retaining projection 61a provided to a portion of the changeover lever 61 to control the rotation in the direction opposite to that shown by the arrow mark 0 in FIG. 5.

When the changeover lever 61 is thrustedly actuated in the forward direction shown by the arrow mark M in FIG. 5, a lever abutment portion 62b formed at one end of the changeover transmission lever 62 abuts on and engages with the abutment section 63b formed at one end of the trigger transmission lever 63 to thrust the abutment section 63b to turn the trigger transmission lever 63 in the direction shown by the arrow mark N in FIGS. 6A and 6B. At this time, the changeover transmission lever 62 is controlled in its rotation opposite to the direction of the arrow mark 0 in FIGS. 6A and 6B by that the rotation control section 62c formed at the other end of the lever 62 abuts on and engages with the retaining projection 61a provided at a portion of the changeover lever 61.

With the trigger transmission lever 63 turned in this manner, the bent portion 56d is engaged with the abutment section 63a formed at one end of the trigger transmission lever 63 and the abutment section 63a is thrustedly actuated to shift the trigger lever 56 in the forward direction of the reciprocation as indicated by the arrow mark L in FIG. 6B. The normal direction and the reverse direction for reproduction may be interchanged by such shifting of the trigger lever 56 in the forward direction of the reciprocation as indicated by the arrow mark L in FIG. 6B.

When the changeover lever 61 is further slid in the forward direction of the reciprocation as indicated by the arrow mark M in FIGS. 6A and 6B, the trigger transmit lever 63 is further turned in the direction shown by the arrow mark N in FIG. 6B to release the engagement between the abutment section 63b at the other end of the trigger transmit lever 63 and the abutment portion 62b at one end of the changeover transmit lever 62 to cause the abutment portion 62b of the changeover transmit lever 62 to pass by and be spaced from the abutment section 63b of the trigger transmit lever 63. This releases the thrusting of the trigger transmit lever 63 by the changeover transmit lever 62, so that the trigger lever 56 is shifted under the bias of the first spring plate 57 in the returning direction shown by the arrow mark L' in FIG. 7, until arriving at the initial position shown in FIG. 5. The trigger transmit lever 63 is turned in the returning direction shown by the arrow mark N' in FIG. 7 until arriving at the position of abutting on the bent portion 56d of the trigger lever 56 in which the abutment section 63a is returned to its initial position.

When the changeover lever 61 is shifted under the force of the second spring plate 60 in the returning direction shown by the arrow mark M' in FIG. 7A, the abutment section 62b of the changeover transmit lever 62 abuts on and engages with the abutment section 63b of the trigger transmit lever 63, as shown in FIG. 7B. At this time, the trigger transmit lever 63 is returned to its initial position, as shown in FIG. 7B, so as to be positioned by the retaining pin 63c. The changeover transmit lever 62 is turned by the abutment section 63b in the direction opposite to that indicated by the arrow mark 0 in FIGS. 7B and 8, so that the abutment section 62c is spaced apart from the retaining projection 61a. When the changeover transmit lever 61 is returned to its initial position shown in FIG. 5, the changeover transmit lever 62 is turned in the direction shown by the arrow mark 0 in FIG. 8 so as to be forcibly returned to its initial position shown in FIG. 5 by the rotation control section 62c at the other end abutting on a return projection 64 provided on the chassis base plate 5. Thus, when the changeover transmit lever 61 is returned to its initial position, the rotation control section 62c of the changeover transmit lever 62 in clamped between the returning projection 64 and the retaining projection 61a.

Figure 9:
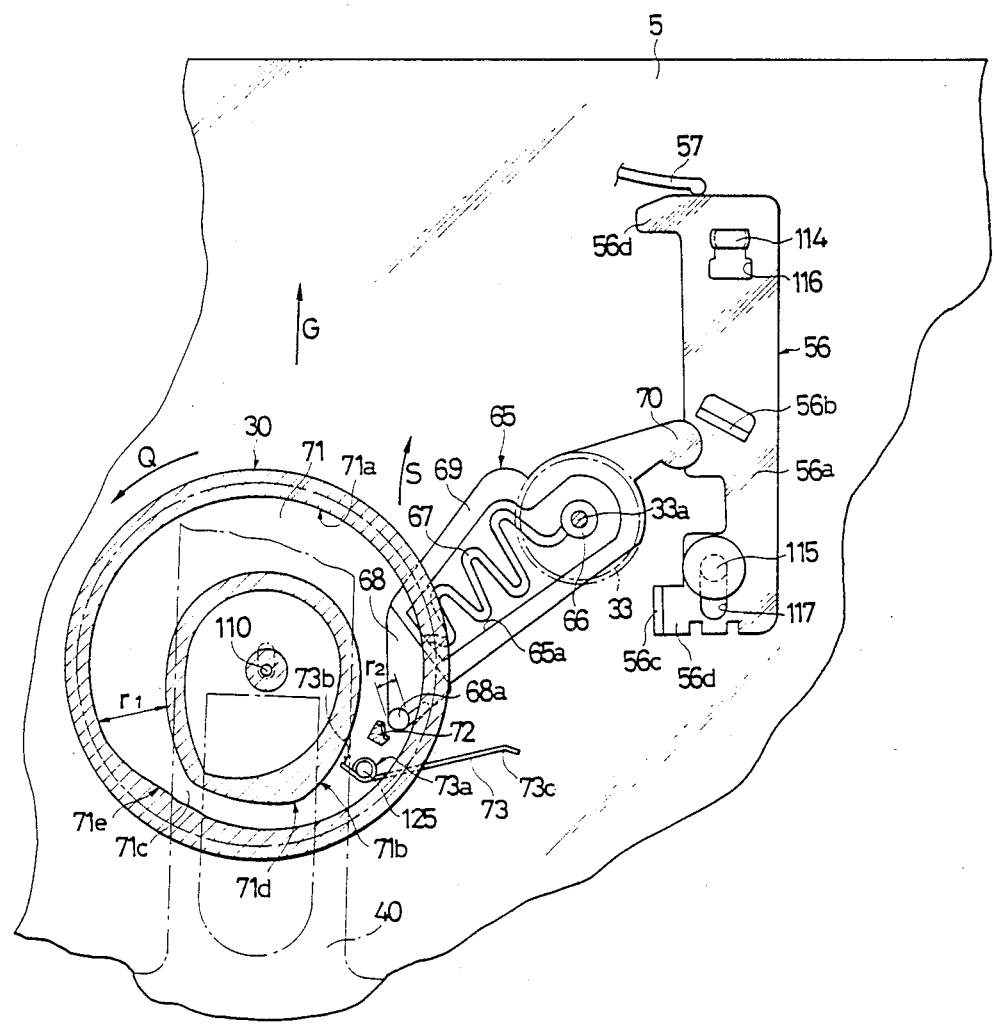
FIG. 9 is a plan view showing a tape end detecting mechanism of the tape recorder, with portions thereof being broken away.
Figure 10:
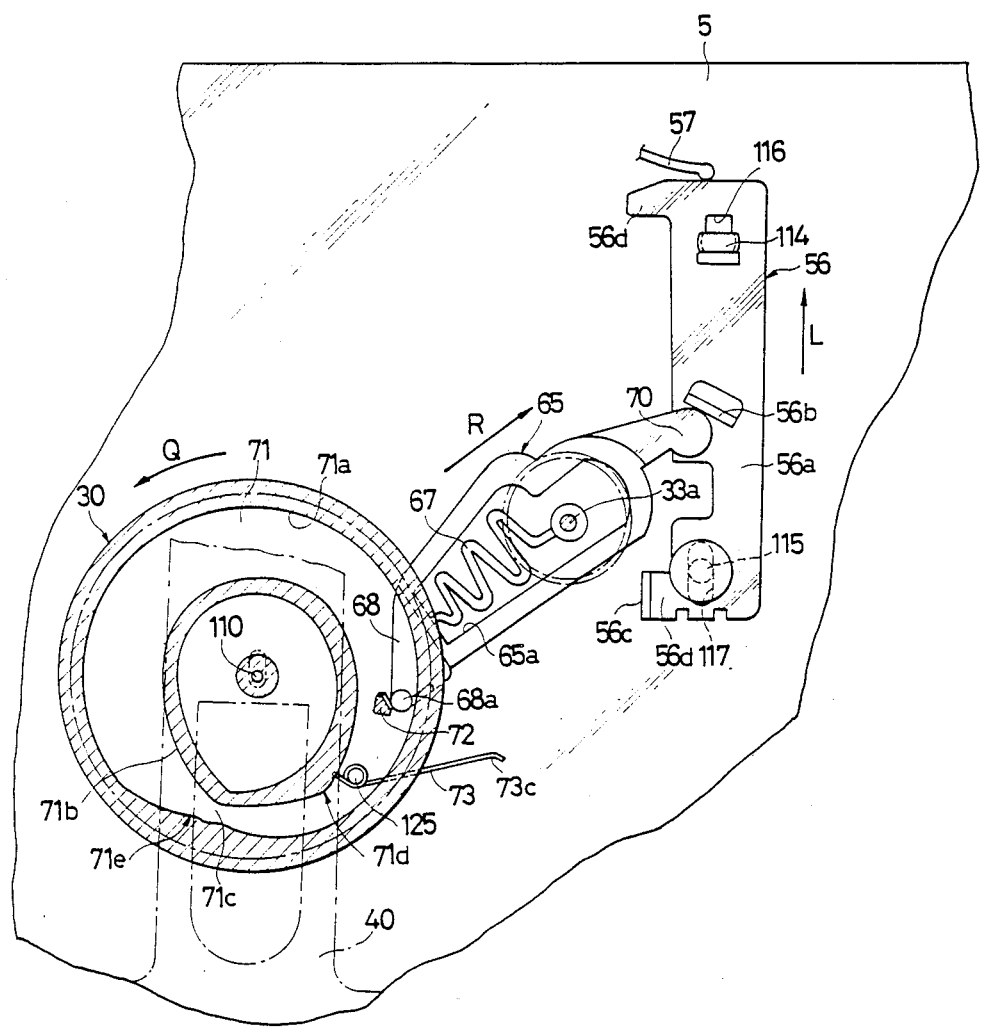
FIG. 10 is a plan view showing the tape end detecting mechanism of FIG. 9 and showing the state of detection of the tape end, with portions thereof being broken away.

Tape End Detection Mechanism (FIGS. 1, 9 and 10)

The tape end detection mechanism is explained by referring to FIGS. 1, 9 and 10.

This tape end detection mechanism is shown in FIG. 9 and comprised of a detecting lever 65 having its one end engaging in a cam groove 71 formed on one planar surface 30b of the perpetually, rotated cam gear 30 and having its other end engageable with the aforementioned trigger lever 56.

This lever 56 is formed as one piece from synthetic resin and, as shown in FIG. 9, has a main body of the lever 69 having an opening 65a. A profiling projection 68a engaging in the cam groove 71 is protuberantly formed at an end 68 of the main body of the lever 69 and a trigger lever thrust section 70 is protuberantly provided at the other end of the main body 69 opposite to the profiling projection 68a. Within the opening 65a of the main body of the lever 69, there is provided a flexual arm 67 that may be extended and contracted in the direction of elongation and having a cylindrical end fulcrum 66 with the end 68 as the connecting portion.

This flexual arm 67 is formed by a plurality of bent sections of reduced thicknesses in the form of a spring. The detection lever 65 is so formed that the fulcrum 66 and the trigger lever thrust section 70 is situated on a substantially straight line.

The detection lever 65 is turnably supported with the gear shaft 33a as center by having the fulcrum 66 at the end of the flexual arm 67 supported by the gear shaft 33a of the first reel block gear 33 by the medium of a friction member, such as a coil spring, and by having the profiling projection 68a engaging in a cam groove 71 formed in the cam gear 30. In the above described detection lever 65, the flexural arm 67 is extended or contracted as the cam gear 30 is turned and the profiling projection has variable engaging positions in the cam groove 71. The trigger arm thrust section 70 is advanced or receded with extension and contraction of the flexual arm 67.

The cam groove 71 formed on the planar surface 30b of the cam gear 30 and engaged by the profiling projection of the detection lever 65 has an outer peripheral cam surface 71a and an inner peripheral cam surface 71b. Within the cam groove 71, there is formed a center ring section 71c having a distance $r_1$ between the outer peripheral cam surface 71a and the inner peripheral cam surface 71b equal to the diameter $r_2$ of the profiling projection 68a. Within the cam groove 71 and at a position on the same rotational trajectory as the center ring 71c and spaced a predetermined angle from the center ring 71c, there is protuberantly formed a trigger pawl 72 independently from the outer peripheral cam surface 71a and the inner peripheral cam surface 71b.

In the reproducing mode, when the tape cassette 4 is attached in position and the magnetic tape 3 is in running state in the tape cassette 4, the first reel block 6 is rotated in one or the other direction. At this time, the fulcrum 66 is rotationally biased by one reel block gear 33 via friction member for rotationally biasing the detection lever 65. When the reproduction or recording is performed in the normal direction, for example, the detection lever 65 is rotationally biased so that the profiling projection 68a is directed towards the outer periphery of the cam gear 30 and, when the reproduction or recording is performed in the reverse direction, the detection lever 65 is rotationally biased so that the profiling projection 68a is directed towards the inner periphery of the cam gear 30.

In the reproducing mode, since the cam gear 30 is driven rotationally by the drive motor 17 in the direction shown by the arrow mark Q in FIG. 9, so that the profiling projection 68a is moved so as to follow up with the contour of the cam groove 71. When the reproduction or recording is performed in the normal direction, for example, the profiling projection 68a is moved as it is guided by the outer peripheral cam surface 71a of the cam groove 71 and, when reproduction or recording is performed in the reverse direction, the profiling projection 68a is moved as it is guided by the inner peripheral cam surface 71b of the cam groove 71. In this manner, during running of the magnetic tape 3, the profiling projection 68a is moved along the outer peripheral cam surface 71a or the inner peripheral cam surface 71b, due to rotation of the first reel block 6 and the rotational driving of the drive motor 17, so that the projection 68a is moved by being guided along the outer peripheral cam surface 71a or the inner peripheral cam surface 71b, without abutting on the trigger paul 72, even after passing by the center ring section 71c.

When the magnetic tape 3 is taken up to its end in the reproducing mode, the rotation of the first reel block 6 and that of the first reel block gear 33 are terminated. With the rotation of the reel block gear 33 thus terminated, rotational bias is no longer applied to the detection lever 65. The rotation of the second reel block 7 ceases, so that the rotation of the second reel block gear 34 and the inverting gear 35 also ceases. The rotation of the intermediate gear 31 meshing with one of the first reel block gear 33 and the inversion gear 35 ceases while that of the second gear section 30c of the cam gear 30 also ceases. However, since the second gear section 30c is mounted to the cam gear 30 with the medium of the friction member, rotation of the first gear section 30a and the cam gear 30 is continued.

When the profiling projection 68a of the detection lever 65 reaches the center ring section 71c in the cam groove 71, by the rotation of the cam gear 30, until arriving at a position on the shifting trajectory of the trigger pawl 72, the detection lever 65 no longer biased rotationally by the reel block gear 33, so that the profiling projection 68a is left at the position on the shifting trajectory of the trigger pawl 72. That is to say, the detection lever 65 is at a standstill at a predetermined position as indicated in FIG. 9. On further rotation of the cam gear 30 in the direction shown by the arrow mark Q in FIG. 9, the trigger pawl 72 provided within the cam groove 71 abuts on the profiling projection 68a. On still further rotation of the cam gear 30, the flexural arm 67 is thrustedly biased so as to be compressed in the direction shown by the arrow mark R in FIG. 10. The profiling projection 68a, thus thrusted by the trigger pawl 72, is shifted to approach towards the fulcrum 66 with compression of the flexural arm 67. By such thrusting of the profiling projection 68, the flexural arm 67 is compressed in the direction shown by the arrow mark R in FIG. 10, while the main body of the lever 69 is shifted in the same direction with respect to the fulcrum 66. When the main body of the lever 69 is thrusted in the direction of the arrow mark R in FIG. 10, the trigger lever thrusting section 70 provided to the other end of the main body of the lever 69 in opposition to a mating thrust pawl 56b provided to the trigger lever 56 thrusts the mating pawl 56b to shift the trigger lever 56 in the forward direction shown by the arrow mark L in FIG. 10 for interchanging between the normal direction and the reverse direction for reproduction or recording, in the manner as described hereinabove.

It is noted that, when guided and shifted by the inner peripheral cam surface 71b, the profiling projection 68a of the detecting lever 71 is guided by the first projection on the inner peripheral cam surface 71b so as to be moved more peripherally outwardly than the center ring section 71c before reaching the center ring section 71c within the cam groove 71. Therefore, in both the normal and reverse directions in the reproducing or recording mode, the profiling projection 68a is guided, when proceeding to the center ring section 71c, from the more peripherally outer side than the center ring section 71c, that is, along the outer peripheral cam surface 71a of the cam groove 71. Thus, in both the normal and reverse directions of the reproducing or recording mode, the profiling projection 68a may be positioned accurately without being affected by so-called backlashes as the reaction force to the rotational bias caused by the frictional member provided in the fulcrum 66. After passing through the center ring section 71c, the profiling projection 68a is guided by the second projection 71e on the outer peripheral cam surface 71a towards the more peripherally inner side of the cam groove 71 and is corrected in its position so as to lie correctly on the shifting trajectory of the trigger pawl 72.

In the fast feed and rewind modes, for preventing the profiling projection 68a of the detecting lever 65 from abutting on the trigger pawl 72 on the cam gear 30, a detecting lever shifting member 73 is provided that is shifted in operative association with the shifting of the magnetic head shifting member 40. The detecting lever shifting member 73, formed as a torsion coil spring 73a, carries a central coil part 73a by a supporting shaft 125 mounted on the chassis base plate 5, and is rotatably mounted for rotation about the supporting shaft 125 as center. This detecting lever shifting member 73 has its one arm section 73b engaged with one side of the magnetic head shifting lever 40 and, in the fast feed and rewind modes, has its other arm section 73c abutting on and engaging with one side of the detecting lever 65 for rotationally biasing the detecting lever 65 in the direction shown by the arrow mark S in FIG. 9 in which the profiling projection 68a proceeds towards the inner periphery of the cam groove 71. The tape recorder is set in the reproducing mode and, when the magnetic head shifting lever 40 is shifted in the direction shown by the arrow mark G in FIG. 10, the detecting lever shifting member 73 is turned clockwise in FIG. 9 by way of the one arm section 73b so that the abutting engagement of the other arm section 73c with respect to the other arm section 73c is released to allow for rotation of the detecting lever 65.

Shut-off Mechanism

Figure 11:
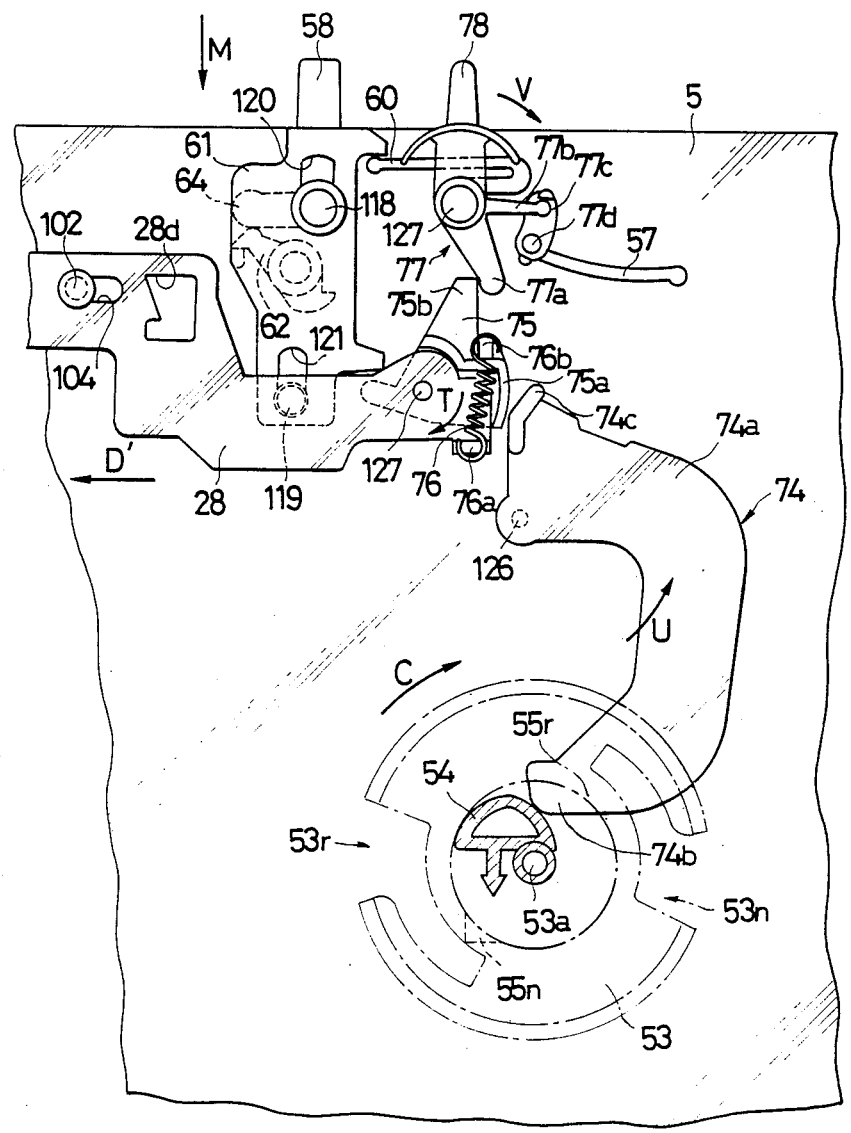
FIG. 11 is a plan view showing a shut-off mechanism and a mode switching mechanism of the tape recorder.
Figure 12:
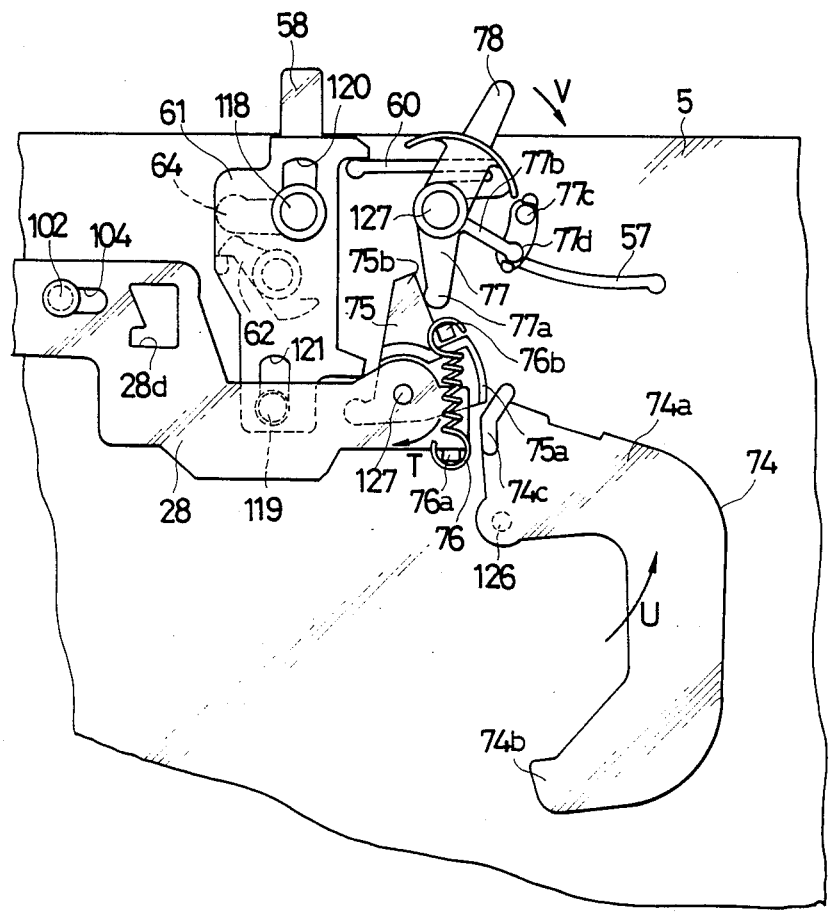
FIG. 12 is a plan view similar to FIG. 11 and showing the state in which the mode of the mode switching mechanism has been switched.

The shut-off mechanism is explained by referring to FIGS. 1, 11 and 12.

The shut-off mechanism is made up of a shut-off lever 74 and a shut-off transmit lever 75. As shown in FIG. 11, the shut-off lever 74 is mounted on the lower surface of the chassis base plate 5, with a mating thrust section 74b bent at right angles with respect to the main body of the lever 74a facing to the rotational trajectory of the offset cam section 54 of the changeover interrupted gear 53 and will a thrusting section 74c at the end of the bent portion facing to one end of the locking plate 28. The shut-off lever 74 is mounted for rotation about a supporting shaft 126 on the lower surface of the chassis base plate 5 as center by having the bent proximal end of the shut-off lever 74 supported by the supporting shaft 126, with the thrusting section 74c being formed at the proximal end of the lever 74. The shut-off transmit lever 75 is mounted for rotation via a supporting shaft 127 mounted at one end of the locking plate 28, with a mating thrust member 75a at one end of the lever 75 facing to the thrusting member 74c at the other end of the shut-off lever 74. The shut-off transmit lever is rotationally biased counterclockwise or in the direction shown by the arrow mark T in FIG. 11 in which the mating thrust section 75a is intruded into a space between the locking plate 28 and the mating thrust section 74c of the shut-off lever 74 and into abutment with the thrusting section 74.

In the reproducing mode, when the changeover interrupted gear 53 is turned in the direction shown by the arrow mark C in FIG. 11 in which the changeover interrupted gear 53 is turned from the reverse position to the normal position, the shut-off lever 74 has its mating thrust section 74b thrusted by the offset cam section 54 so as to be turned in the U direction shown in FIG. 10. When the shut-off lever 74 is turned in this manner, the thrusting section 74c at the other end thrusts one end of the locking plate 28 by the medium of the mating thrust section 75a of the shut-off transmit lever 75 to shift the locking plate 28 in the direction shown by the arrow mark D' in FIG. 11. When the locking plate 28 is shifted in the direction shown by the arrow mark D' in FIG. 11, the reproducing lever 24 thrusted in the forward direction of reciprocation and locked by the locking plate 28 will the pawl section 24a engaging in the retaining pawl 28i is unlocked in the forward direction of reciprocation and the reproducing mode is released to terminate the reproducing or recording operation.

The shut-off transmit lever 75 is controlled in its rotational bias position brought about by the torsion spring 76 by abutment of the mating thrust section 75a with the locking plate 28. The shut-off transmit lever 75 has its other end facing to the side formed with the mating thrust section 75a facing to and abutting with the other end of the changeover lever 61, so that, as the changeover lever 61 is thrusted in the forward direction shown by the arrow mark M in FIG. 11, the shut-off transmit lever 75 is turned counterclockwise, that is, in the direction opposite to that shown by the arrow mark T in FIG. 11, against the force of the tension spring 76. When the shut-off transmit lever 75 is turned by being thrusted by the changeover lever 61, the mating thrust member 75a is disengaged from the space between the locking plate 28 and the thrusting section 74c of the shut-off lever 74, so that the actuation of the mating thrust member 75 by the shut-off lever 74 becomes unfeasible, and hence the thrusting of the locking plate 28 by the shut-off lever 74 also becomes unfeasible. Thus, since the changeover lever 61 is shifted in the forward direction as indicated by the arrow mark M in FIG. 11, so that the shut-off transmit lever 75 is turned counterclockwise or in the direction opposite to that shown by the arrow mark T in FIG. 11, the locking plate 28 is not thrusted even when the changeover interrupted gear is rotationally driven and the shut-off lever 74 is turned in the direction shown by the arrow mark U in FIG. 11.

When turned as shown in FIG. 12, the shut-off transmit lever 75 has its mating thrust section 75a confronted by the inclined surface of the chevron-shaped portion of the shut-off lever 74, so that, when the lever 75 is returned counterclockwise or in the direction shown by the arrow mark T in FIG. 12 under the bias of the tension spring 76, it thrusts the thrusting section 74c of the shut-off lever 74 to turn and restore the shut-off lever 74 to its initial position.

Mode Changeover Mechanism (FIGS. 1, 11 and 12)

The mode changeover mechanism is explained by referring to FIGS. 1, 11 and 12.

This mode changeover mechanism makes a changeover between the mode of actuating the shut-off mechanism and the mode of not actuating the shut-off mechanism when the reproducing or recording mode is switched from the normal direction to the normal direction.

As shown in FIGS. 11 and 12, the mode changeover mechanism is constituted by a mode changeover lever 77 adapted for turning the shut-off transmit lever 75. The mode changeover lever 77 is turnably supported by the supporting shaft 127 mounted upright on the lower surface of the chassis base plate 5, with an actuating portion at one end of the lever 77 abutting on the mating portion 75b protuberantly provided at one end of the shut-off transmit lever 75 and with an actuating portion 78 on the other end of the lever projecting outwardly of the chassis base plate 5. When the mode changeover lever 77 is turned in the direction shown by the arrow mark U in FIG. 11 via actuating portion 78, the actuating portion 77a thrusts the mating portion 75b of the transmit lever 75 to turn the shut-off transmit lever 75 in the direction shown by the arrow mark T in FIG. 11 against the bias of the tension spring 76. As the shut-off transmit lever 75 is turned in the direction opposite to that shown by the arrow mark T in FIG. 11, rotation of the locking plate 28 by the shut-off lever 74 becomes unfeasible, while the shut-off mechanism cannot be actuated, as shown in FIG. 12.

A resiliently deformable retaining arm 77b is protuberantly provided on one side of the mode changeover lever 77. This retaining arm 77b is selectively engaged and retained in plural retaining recesses 77c, 77d provided in the chassis base plate 5, as shown in FIGS. 11 and 12, for positioning the mode changeover lever 77 in the predetermined position.

Supporting Mechanism for Pinch Roll and Magnetic Head

The supporting mechanism of the first and second pinch rolls 10, 11 and the magnetic head 12 will be explained by referring to FIG. 13.

Figure 13:
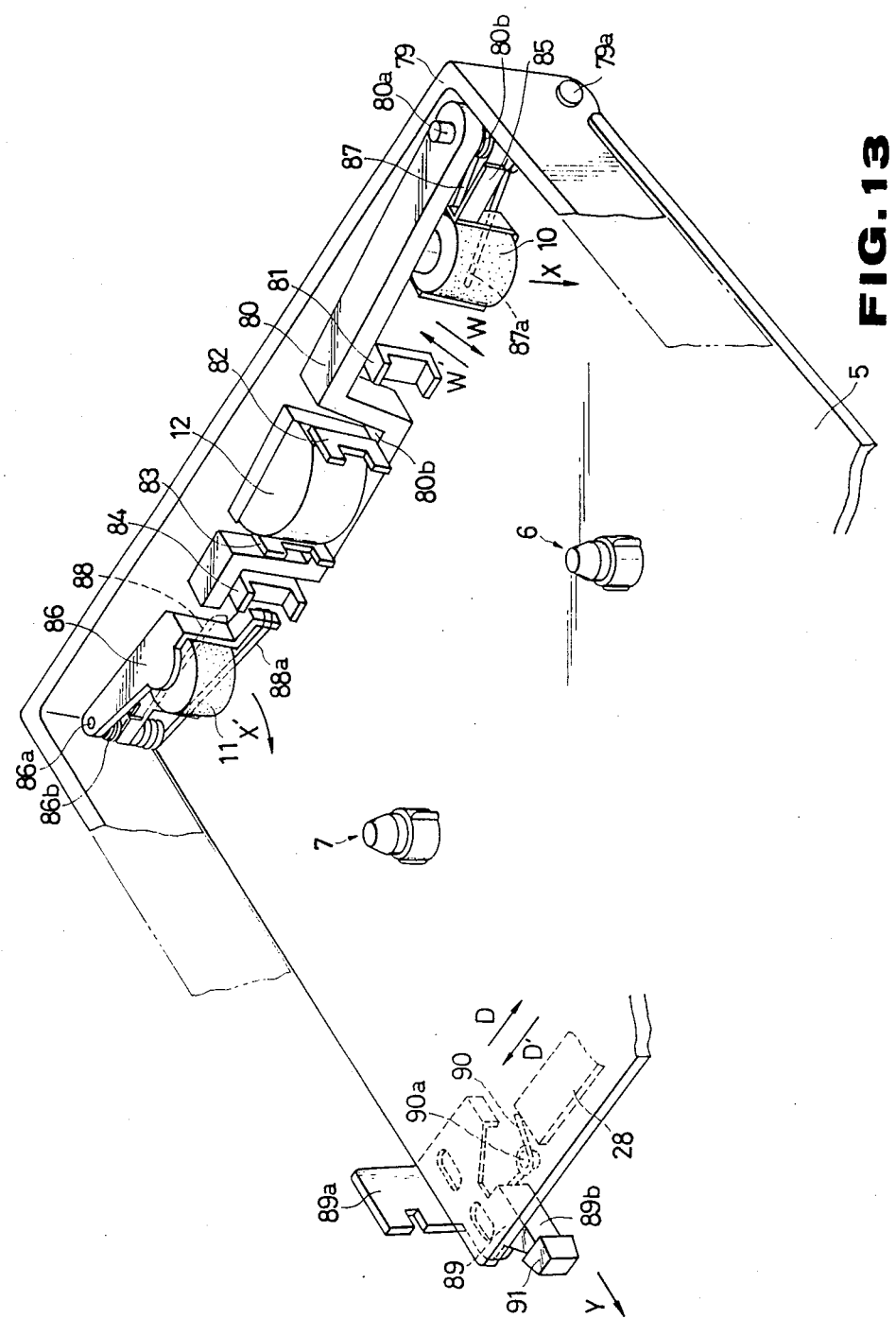
FIG. 13 is a perspective view showing the supporting mechanism for the pinch rolls and the magnetic head of the tape recorder.

The magnetic head 12 and the first and second pinch rolls 10, 11 are mounted to a cassette holder 79 rotatably mounted to the chassis base plate 5 via pivot shaft 79a, as shown in FIG. 13. The magnetic head 12 is mounted to a recessed head mounting section 80b formed halfway on a magnetic head supporting arm 80 that is turnably supported in the directions shown by the arrow mark W and W' in FIG. 13 by having its proximal end carried by a supporting shaft 80a mounted upright on one corner of the cassette holder 79. Tape guides 81, 82 are mounted to the magnetic head supporting arm 80 so as to be situated on both sides of the magnetic head 12. Tape guides 83, 84 are similarly provided on both sides of the magnetic head 12.

The pinch rolls 10, 11 are rotatably supported on the ends of first and second pinch roll supporting arms 85, 86 turnably mounted within the cassette holder 79. More specifically, the first pinch roll supporting arm 85 carrying the first pinch roll 10 is turnably mounted by having its proximal end supported by the supporting shaft 80a of the magnetic head supporting arm 80, while the second pinch roll supporting arm 86 carrying the second pinch roll 11 is also turnably mounted by having its proximal end supported by a supporting shaft 86a mounted upright at the other corner of the cassette holder 79 facing to the supporting shaft 80a. Pinch roll thrust springs 87, 88 in the form of torsion coil springs are placed about the supporting shaft 80a supporting the first pinch roll supporting arm 85 and the supporting shaft 86a supporting the second pinch roll supporting arm. Return springs 80b, 80b in the form of torsion coil springs are placed about the supporting shafts 80a, 86a for rotationally biasing the first and second pinch roll supporting arms 85, 86 in the direction in which the associated pinch rolls are shifted away from the capstan shafts 8, 9 respectively.

In the above described tape recorder, when the reproducing mode is selected, the magnetic head shifting lever 40 is shifted in the direction shown by the arrow mark G in FIG. 1, as described hereinabove, the magnetic head engaging pawl 40a provided at one end of the magnetic head shifting lever 40 engages and thrusts the rear side of the magnetic head supporting arm 80 to turn the arm 8 0 in the direction shown by the arrow mark W in FIG. 13 to advance the magnetic head 12 mounted to a mid portion of the magnetic head supporting arm 80 in a direction of causing the head to be slidingly contacted with the magnetic head 3. The pinch roll shifting lever 41 is shifted along with the shifting lever 40 which being turned in the direction shown by the arrow marks H or H' in FIG. 3. The turning direction of the shifting lever 41 is determined in dependence upon whether the running direction of the magnetic tape 3 is normal or reverse. Thus, when the normal or reverse running direction of the magnetic tape 3 is selected, the shifting lever 41 is turned in the direction shown by the arrow marks H or H' in FIG. 3, respectively. When the normal running direction of the magnetic tape 3 is selected, the first pinch roll engaging pawl 42 engages with one end 88a of the pinch roll thrusting spring 88 to thrust the pinch roll supporting arm 86 from its rear side to turn the arm 86 in a direction in which the second pinch roll 11 approaches towards the second capstan shaft 9. When the reverse running direction of the magnetic tape 3 is selected, the second pinch roll engaging pawl 43 engages with one end 87a of the pinch roll thrusting spring 87 on the side associated with the first pinch roll supporting arm 85 to thrust the pinch roll supporting arm 85 from the rear side to turn the arm 86 in the direction in which the first pinch roll 10 approaches towards the first capstan shaft 8.

When the pinch roll supporting arms 85, 86 are turned as described hereinabove, the one ends 87a, 88a of the pinch roll thrust springs 87, 88 engaging with the front sides of the pinch roll supporting arms 85, 86 are thrusted from their rear sides by the pinch roll engaging pawls 42, 43, so that the pinch roll supporting arms 85, 86 are rotationally biased by the other ends 87b, 88b of the pinch roll thrust springs 87, 88 in the directions shown by the arrow marks X, X' in FIG. 11, respectively, for rotationally biasing the pinch rolls 10, 11 into pressure contact with the capstan shafts 8, 9.

The cassette holder 79 is locked at the tape cassette attachment position by having a mating locking member, not shown, engaged with a locking member 89a of a cassette holder locking lever 89 reciprocatingly mounted to the chassis base plate 5, in the state in which the cassette holder 79 has been turned to the tape cassette attachment position with the tape cassette 4 being attached to the tape cassette attachment section.

Referring to FIG. 1, a cassette holder locking lever 89 for locking the cassette holder 79 in the tape cassette attachment position is mounted for reciprocating with respect to the chassis base plate 5, with slide guide shafts 127, 128 on the chassis base plate 5 engaging in slide guide openings 130, 131 formed in the cassette holder locking lever 89 so that their long axes are extended in the longitudinal direction of the cassette holder locking lever 89. This cassette holder locking lever 89 is perpetually biased in the direction shown by the arrow mark Y in FIG. 1 in which a lock lever biasing spring 90 mounted on the chassis base plate 5 has its other end 90c engaged with a spring retainer 89b on one side of the cassette holder locking lever 89 to engage the locking member 89a with a mating locking member of the cassette holder 79 to lock the cassette holder 79 at the tape cassette attachment position. Meanwhile, the locking lever biasing spring 90 has its one end 90b thrusting and biasing the locking plate 28 in the direction shown by the arrow mark D in FIG. 1.

A cassette holder opening button 91 is provided at the end of the cassette holder locking lever 89 protruded outwardly of the chassis base plate 5. As this cassette holder opening button 91 is thrustedly actuated, so that the cassette holder locking lever 89 is thrust in the direction opposite to that shown by the arrow mark Y in FIG. 1, against the force of the locking lever biasing spring 90, the locking member 89a is shifted in the same direction and out of engagement with the mating locking member of the cassette holder 79 to set the cassette holder 79 so as to be rotated freely, such that the cassette holder 79 may be rotated towards outside from the tape cassette attachment position to allow for insertion and removal of the tape cassette 4.

On the other hand, when the reproducing lever 24, fast feed lever 26 on the rewind lever 27 is thrustedly actuated, that is, when the reproducing mode, fast feed mode or the rewind mode is selected, the switch plate 29 has been shifted in the direction shown by the arrow mark D' in FIG. 1, so that the slide plate 29 has its one end confronted by a projection 89b formed on one side of the cassette holder locking lever 89 to inhibit thrusting of the cassette holder locking lever 89 in the direction shown by the arrow mark Y in FIG. 1. Therefore, even when the cassette holder opening button 91 is thrustedly actuated, shifting of the cassette holder locking lever 89 in the direction shown by the arrow mark Y in FIG. 1 is inhibited to maintain the state of the cassette holder 79 in which the cassette holder 79 has been turned to and locked at the tape cassette attachment position.

Although an illustrative embodiment of the present invention has been explained hereinabove, the present invention is not limited to this specific embodiment, but may be modified emitably within the scope of the invention. For example, various levers may be changed in their shape or structure from that shown in the above described embodiment. In addition, various gears employed in the above embodiment may be replaced by idlers formed of, for example, rubber or the like material.

The present invention is not limited to the auto reverse type tape recorder employing the standard size tape cassette but may be applied to various types of auto reverse type recording and/or reproducing apparatus.

In the rotation detection mechanism for the tape recorder according to the present invention, when the reel block is halted and the detecting lever is no longer biased rotationally, a movable member of this detecting lever remains stationary at a position in which it has been shifted by a rotation detecting cam member and a detecting pawl may abut on this movable member for detecting the halted state of the reel block.

What is claimed is:

1. A rotation detecting mechanism for a tape recorder comprising
   a movable shut-off lever for setting at least one of a reproducing lever and a head base at a stop state position, one of said reproducing lever and the head base being previously set to the reproducing state position,
   a movable changeover lever for interchangeably setting one of a normal reproducing direction and a reverse reproducing direction of a magnetic tape,
   switching means for selectively shifting and setting one of said shut-off lever and said changeover lever,
   a movable trigger lever for selectively triggering said switching means,
   a detecting lever rotationally biased in a direction which is in accordance with a rotation and a rotational direction of a reel block, and
   a cam gear rotated perpetually in one direction, said cam gear including a first cam surface guiding one end of said detecting lever when said detecting lever is rotationally biased in one direction, a second cam surface guiding one end of said detecting lever when said detecting lever is rotationally biased in the other direction, a detecting pawl protuberantly formed between and independently of said first cam surface and said second cam surface, and a center ring section responsive to the cessation of rotation of said reel block to guide one end of said detecting lever released from rotational biasing towards a rotational trajectory of said detecting pawl,
   said detecting pawl thrusting said one end of said detecting lever so that the other end of said detecting lever actuates said trigger lever.

2. The mechanism according to claim 1 wherein said first and second cam surfaces, detecting pawl and said center ring section are formed on the one same surface of said cam gear.

3. The mechanism according to claim 1 wherein a clearance to allow for passage of at least said one end of said detecting lever is provided between said first cam surface and said detecting pawl.

4. The mechanism according to claim 1 wherein said center ring section is formed integrally with and as a continuation of said first and second cam surfaces.

5. The mechanism according to claim 4 wherein at least two center ring sections are provided on one of said first cam surface and said second cam surface.

6. The mechanism according to claim 1 wherein said detecting lever is turnable about a pivot and slidable in a direction normal to the direction of said pivot, said detecting lever being rotationally biased in a direction which is in accordance with the rotation and the rotational direction of said reel block and being slid by being thrusted at its one end by said detecting pawl for actuating said trigger lever at its other end.

7. The mechanism according to claim 6 wherein said detecting lever is formed integrally with a return spring member for biasing said detecting lever against the direction in which it is thrust by said detecting pawl.

8. The mechanism according to claim 1 wherein said switching means include an interrupted cam gear provided with a shut-off cam section driven intermittently in contrast to a drive gear driven rotationally at all times and selectively driving said shut-off lever, a switching cam section for selectively driving said switching lever, at least two mating locking sections and an interrupted gear teeth section, and
   rotational bias means for rotationally biasing said interrupted cam gear in one direction.

9. The mechanism according to claim 8 wherein said trigger lever is engaged with said mating locking section and adapted to lock the rotation of said interrupted cam gear at a position in which said interrupted gear teeth section is confronted by said driving gear, said trigger lever being perpetually biased in a direction of being engaged with said mating locking section.

* * * * *